US012296292B2

(12) United States Patent
Wenger et al.

(10) Patent No.: US 12,296,292 B2
(45) Date of Patent: May 13, 2025

(54) SYSTEMS AND METHODS FOR OPTIMIZATION OF OCCUPIED SPACE COMFORT, AIR QUALITY, AND ENERGY CONSUMPTION

(71) Applicant: TRANE INTERNATIONAL INC., Davidson, NC (US)

(72) Inventors: Scott Wenger, Mooresville, NC (US); Scott Huffmaster, Austin, TX (US)

(73) Assignee: TRANE INTERNATIONAL INC., Davidson, NC (US)

( * ) Notice: Subject to any disclaimer, the term of this patent is extended or adjusted under 35 U.S.C. 154(b) by 604 days.

(21) Appl. No.: 17/646,440

(22) Filed: Dec. 29, 2021

(65) Prior Publication Data
US 2022/0203288 A1      Jun. 30, 2022

Related U.S. Application Data

(63) Continuation-in-part of application No. 17/136,923, filed on Dec. 29, 2020, now Pat. No. 11,865,487.

(51) Int. Cl.
*B01D 46/46* (2006.01)
*B01D 46/00* (2022.01)
(Continued)

(52) U.S. Cl.
CPC ......... *B01D 46/46* (2013.01); *B01D 46/0028* (2013.01); *B01D 46/0036* (2013.01);
(Continued)

(58) Field of Classification Search
CPC .... F24F 2110/10; F24F 2110/20; F24F 11/46; F24F 11/64; B01D 2279/50; B01D 2279/65; B01D 46/46
See application file for complete search history.

(56) References Cited

U.S. PATENT DOCUMENTS

2013/0178987 A1    7/2013   Meirav et al.
2016/0271550 A1    9/2016   Law
(Continued)

FOREIGN PATENT DOCUMENTS

CN        209341432 U    9/2019
EP          3121524 A1   1/2017
(Continued)

OTHER PUBLICATIONS

Extended European Search Report issued on May 30, 2022, European Patent Application No. 21218112.7 (7 pages).
(Continued)

*Primary Examiner* — Robert Clemente
(74) *Attorney, Agent, or Firm* — HSML P.C.

(57) ABSTRACT

Systems and methods of holistically controlling a heating, ventilation, air conditioning, and refrigeration (HVACR) system and a multi-contaminant air cleaner (MCAC) are disclosed. The method includes sensing, via at least one HVACR sensor, at least one comfort parameter; sensing, via at least one MCAC sensor, at least one air-quality parameter; determining, via a controller, minimum air changes of the HVACR system based on the at least one comfort parameter; and determining, via the controller, equivalent air changes of the MCAC and an indoor air quality (IAQ) score based on the at least one air-quality parameter. The method also includes controlling an operation of the HVACR system and controlling an operation of the MCAC based on the determined air changes to optimize an energy consumption.

20 Claims, 14 Drawing Sheets

(51) Int. Cl.
*B01D 46/44* (2006.01)
*B01D 53/04* (2006.01)

(52) U.S. Cl.
CPC ......... *B01D 46/442* (2013.01); *B01D 46/448* (2013.01); *B01D 53/0454* (2013.01); *B01D 2257/106* (2013.01); *B01D 2257/502* (2013.01); *B01D 2257/708* (2013.01); *B01D 2257/91* (2013.01); *B01D 2279/50* (2013.01); *B01D 2279/65* (2013.01)

(56) References Cited

U.S. PATENT DOCUMENTS

| | | | |
|---|---|---|---|
| 2016/0282001 A1* | 9/2016 | Meirav | F24F 7/003 |
| 2017/0082305 A1 | 3/2017 | Law | |
| 2019/0346161 A1 | 11/2019 | Meirav et al. | |
| 2020/0182495 A1 | 6/2020 | Park et al. | |
| 2022/0203288 A1 | 6/2022 | Wenger et al. | |
| 2022/0305438 A1* | 9/2022 | Wenger | F24F 11/49 |
| 2024/0176319 A1* | 5/2024 | Risbeck | F24F 8/10 |

FOREIGN PATENT DOCUMENTS

| | | |
|---|---|---|
| EP | 3623714 A1 | 3/2020 |
| JP | 2000262826 A | 9/2000 |
| KR | 20220138880 A | 10/2022 |

OTHER PUBLICATIONS

Office Action issued in U.S. Appl. No. 17/136,923, filed Apr. 14, 2023 (15 pages).

* cited by examiner

SYSTEMS AND METHODS FOR OPTIMIZATION OF OCCUPIED SPACE COMFORT, AIR QUALITY, AND ENERGY CONSUMPTION

FIELD

This disclosure relates generally to holistically controlling a heating, ventilation, air conditioning, and refrigeration (HVACR) system and a multi-contaminant air cleaner (MCAC). More specifically, the disclosure relates to systems and methods for holistically controlling the HVACR system and the MCAC to optimize comfort, air quality, and/or energy consumption for an occupied space.

BACKGROUND

An HVACR system may include a rooftop unit to provide conditioned air to an air distribution system that includes ductwork. In HVACR systems, conditioned air is delivered to a building or occupied space. Air handlers or the air handler sections of an air conditioning unit for meeting the HVACR needs of a building often include a heat transfer circuit system housed within a sheet metal enclosure. The heat transfer circuit may include one or more compressors, a condenser, an evaporator, fans, filters, dampers, and various other equipment. The compressor(s), the condenser, the expansion device, and the evaporator are fluidly connected.

SUMMARY

Building owners and operators (commercial, industrial, and residential) have the ability to control conditioned air movement, temperature, humidity and air cleaning technologies within their building.

The requirements for air filtration systems may vary widely. In some applications (commercial, residential, transport, etc.), it may be advantageous to use higher rated filters to contain contaminants including particulate matter, etc. While a higher rated filter may perform better for filtration than a lower rated version, the performance may come at a cost, both in terms of purchase cost and energy consumption. Additionally, higher rated filter life may be shortened due to continuous use when the benefits of its filtration performance cannot be observed or are otherwise unnecessary. Generally, users have a choice to replace one filter with a different one, but may not have the option for using a higher rated filter only when it is beneficial to do so based on an air quality score such as air quality, occupancy, or other requirements in the conditioned space.

Embodiments disclosed herein provide a selectable or switchable air filter system that uses air quality, occupancy, and/or any other suitable air quality score to decide the required level of filtration, and control airflow across one installed filter versus another filter. Embodiments disclosed herein may reduce the energy intensity of an HVACR system by reducing the amount of time when high pressure drop filters are used in an airflow. Embodiments disclosed herein may also increase the overall life of highly rated, often expensive filters and allow for more time between filter exchanges. Embodiments disclosed herein may further enable uninterrupted air filtration during equipment operation by enabling "hot swap" filter changes.

Embodiments disclosed herein also provide a holistic thermal comfort and air quality system that can control thermal comfort (including temperature, humidity, relative humidity, or the like), ventilation, and air quality within a predetermined or desired range while minimizing energy consumption for a given condition as sensed or measured by sensors and a control system. It will be appreciated that since comfort and air quality typically include variables or parameters dependent on one another, optimized control may require holistic control of both the comfort system (e.g., the HVACR system) and the air quality system (e.g., the MCAC), especially in the context of energy consumption. Embodiments disclosed herein can achieve the optimized control through the integration of the MCAC that may not be completely contained in the duct and/or airflow of the HVACR system but controlled with the HVACR system based on sensor data in the occupied space. The MCAC can achieve energy optimization through equivalent air changes (ACH_e) based on e.g., clear air delivery rate (CADR) or the like, with operation dependent upon continuous or on-demand sensed data or parameters.

A switchable filtration system for an HVACR system is disclosed. The filtration system includes a first filter, a second filter, a switching apparatus, and a controller. The controller is configured to determine an air quality score. When the air quality score exceeds a predetermined threshold, the controller controls the switching apparatus to switch the first filter out of an active airflow path.

A method for switching filters in a filtration system for an HVACR system is disclosed. The filtration system includes a first filter, a second filter, a switching apparatus, and a controller. The method includes determining, by the controller, an air quality score. The method also includes when the air quality score exceeds a predetermined threshold, controlling the switching apparatus to switch the first filter out of an active airflow path. The first filter has a higher pressure drop, or has a higher efficiency, and/or is rated higher than the second filter.

A method of controlling an HVACR system and an MCAC is disclosed. The method includes sensing, via at least one HVACR sensor, at least one comfort parameter. The method also includes sensing, via at least one MCAC sensor, at least one air-quality parameter. The method further includes determining, via a controller, minimum air changes (ACH_min) of the HVACR system based on the at least one comfort parameter and/or other requirements such as commercial ventilation requirements based on occupancy. Also the method includes determining, via the controller, equivalent air changes (ACH_e) of the MCAC and an indoor air quality (IAQ) score based on the at least one air-quality parameter. The method includes reducing an operation of the MCAC when a combination of the minimum air changes and the equivalent air changes exceeds or equals an air changes threshold and the IAQ score exceeds or equals an IAQ threshold. The method also includes increasing an operation of the HVACR system when the combination of the minimum air changes and the equivalent air changes is below the air changes threshold and the operation of the MCAC is maximized. The method further includes increasing the operation of the MCAC when the combination of the minimum air changes and the equivalent air changes exceeds or equals an air changes threshold and the IAQ score is below the IAQ threshold, or when the combination of the minimum air changes and the equivalent air changes is below the air changes threshold and the operation of the MCAC is not maximized.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1:
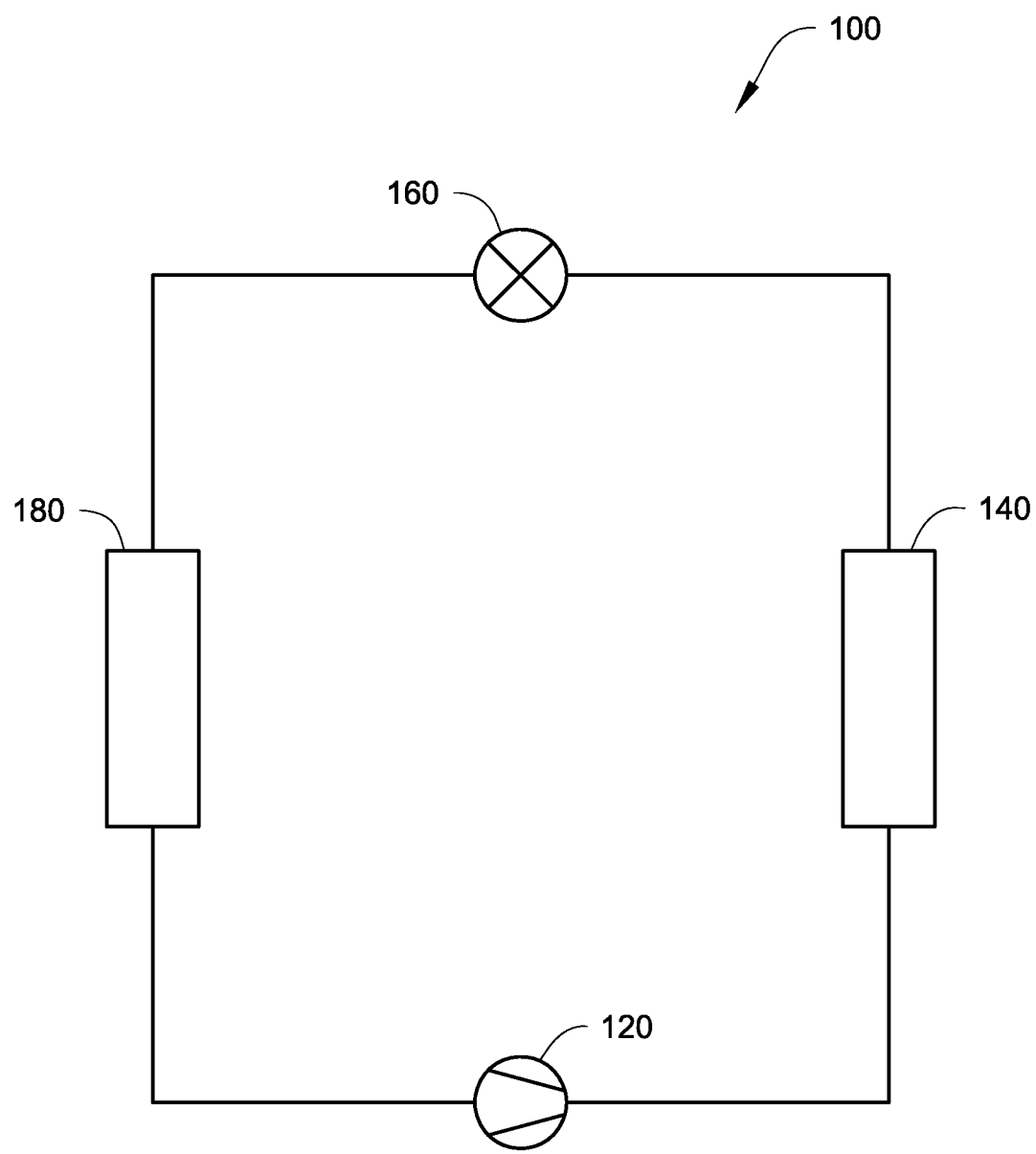
FIG. 1 illustrates a schematic diagram of a refrigeration circuit, which may be implemented in an HVACR system, according to an embodiment.

The following definitions are applicable throughout this disclosure. As defined herein, the term "air handler" or "air handling unit" may refer to a device used to regulate and circulate air as part of an HVACR system. In an embodiment, an air handler may be a large metal box containing a blower, heating or cooling elements, filter racks or chambers, sound attenuators, and/or dampers. Air handler typically connect to a ductwork ventilation system that distributes the conditioned air through the building and returns it to the air handler. In an embodiment, the air handler may discharge (or supply) and admit (or return) air directly to and from the space served without ductwork.

As defined herein, the term "air filter" or "filter" may refer to a device including fibrous and/or porous materials which can remove solid particulates such as dust, pollen, mold, and/or bacteria, etc. from the air. Filters may use foam, pleated paper, cotton, and/or spun fiberglass materials and/or materials with a static electric charge, which attract dust particles. Filters containing an adsorbent or catalyst such as charcoal (carbon) may also remove odors and gaseous pollutants such as volatile organic compounds or ozone. Filters are typically used in applications where air quality is important, such as in building ventilation systems and/or in engines.

As defined herein, the term "filtration" may refer to a physical, biological, or chemical operation that separates solid matter and fluid from a mixture with a filter medium that has a structure through which only the fluid may pass.

As defined herein, the term "rated" or "rating" may refer to filter's ability to remove particles of a certain size from a fluid. For example, a filter that is rated as a "10 micron" filter can capture particles as small as 10 micrometers. Higher rated filter may capture smaller particles. "Rating" may dictate the effectiveness of a filter. Minimum Efficiency Reporting Values (MERVs) can be used to indicate a filter's ability to capture particles. MERV is helpful in comparing the performance of different filters. Typically, the higher the MERV rating, the better the filter is at trapping specific types of particles, and the more efficient the filter. A higher rated filter typically has a higher efficiency, has smaller porosity in the filter to catch more particles in the air, has a higher MERV rating, can capture smaller particles, has a higher pressure drop (e.g., more fan horse-power is required to move the air through/into the spaces, and thus consuming more energy), and is more expensive than a lower rated filter. High-efficiency particulate air (HEPA), also known as high-efficiency particulate absorbing, is an efficiency standard of air filter. HEPA is a type of air filter that may remove at least 99.97% of dust, pollen, mold, bacteria, and/or any airborne particles with a size of at or about 0.3 microns (µm). The diameter specification of at or about 0.3 microns responds to severe cases; the most penetrating particle size (MPPS). HEPA filter is considered as one of the higher rated filters used in the HVACR system.

As defined herein, the term "damper" may refer to a plate-shaped device which opens or close to regulate the amount of air that passes through the duct and vents. Making adjustments on the damper may affect the indoor temperature by pushing cold or hot air into some areas or sections of the building. By adjusting the damper, the amount of air entering the building space via a duct can be reduced or increased.

As defined herein, the term "upstream" and "downstream" may refer to a relative location with respect to a direction of airflow. For example, when the airflow passes a component A before passes a component B, A is disposed upstream of B, and B is disposed downstream of A with respect to the airflow. As defined herein, the term "active airflow path" may refer to e.g., a path of the airflow (e.g., a conditioned airflow) that is delivered to a desired building or occupied space via a duct in the HVACR system.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

FIG. 1 is a schematic diagram of a refrigerant circuit 100, according to an embodiment. The refrigerant circuit 100 generally includes a compressor 120, a condenser 140, an expansion device 160, and an evaporator 180. The refrigerant circuit 100 may also include a controller (see 145 of FIG. 2) configured to control the operations of the compressor 120, the condenser 140, the expansion device 160, and/or the evaporator 180. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any suitable type of expander used in the field for expanding a working fluid to cause the working fluid to decrease in pressure and temperature. The refrigerant circuit 100 is an example and can be modified to include additional components. For example, in an embodiment, the refrigerant circuit 100 can include other components such as, but not limited to, an economizer heat exchanger, one or more flow control devices, a receiver tank, a dryer, a suction-liquid heat exchanger, or the like.

The refrigerant circuit 100 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like. In an embodiment, a HVACR system can be a rooftop unit or a heat pump air-conditioning unit.

The compressor 120, condenser 140, expansion device 160, and evaporator 180 are fluidly connected. In an embodiment, the refrigerant circuit 100 can be configured to be a cooling system (e.g., an air conditioning system) capable of operating in a cooling mode. In an embodiment, the refrigerant circuit 100 can be configured to be a heat pump system that can operate in both a cooling mode and a heating/defrost mode.

The refrigerant circuit 100 can operate according to generally known principles. The refrigerant circuit 100 can be configured to heat and/or cool a liquid process fluid (e.g., a heat transfer fluid or medium (e.g., a liquid such as, but not limited to, water or the like)), in which case the refrigerant circuit 100 may be generally representative of a liquid chiller system. The refrigerant circuit 100 can alternatively be configured to heat and/or cool a gaseous process fluid (e.g., a heat transfer medium or fluid (e.g., a gas such as, but not limited to, air or the like)), in which case the refrigerant circuit 100 may be generally representative of an air conditioner and/or heat pump.

In operation, the compressor 120 compresses a working fluid (e.g., a heat transfer fluid (e.g., refrigerant or the like)) from a relatively lower pressure gas to a relatively higher-pressure gas. The relatively higher-pressure gas is also at a relatively higher temperature, which is discharged from the compressor 120 and flows through the condenser 140. In accordance with generally known principles, the working fluid flows through the condenser 140 and rejects heat to the process fluid (e.g., water, air, etc.), thereby cooling the working fluid. The cooled working fluid, which is now in a liquid form, flows to the expansion device 160. The expansion device 160 reduces the pressure of the working fluid. As a result, a portion of the working fluid is converted to a gaseous form. The working fluid, which is now in a mixed liquid and gaseous form flows to the evaporator 180. The working fluid flows through the evaporator 180 and absorbs heat from the process fluid (e.g., a heat transfer medium (e.g., water, air, etc.)), heating the working fluid, and converting it to a gaseous form. The gaseous working fluid then returns to the compressor 120. The above-described process continues while the heat transfer circuit is operating, for example, in a cooling mode (e.g., while the compressor 120 is enabled).

Figure 2:
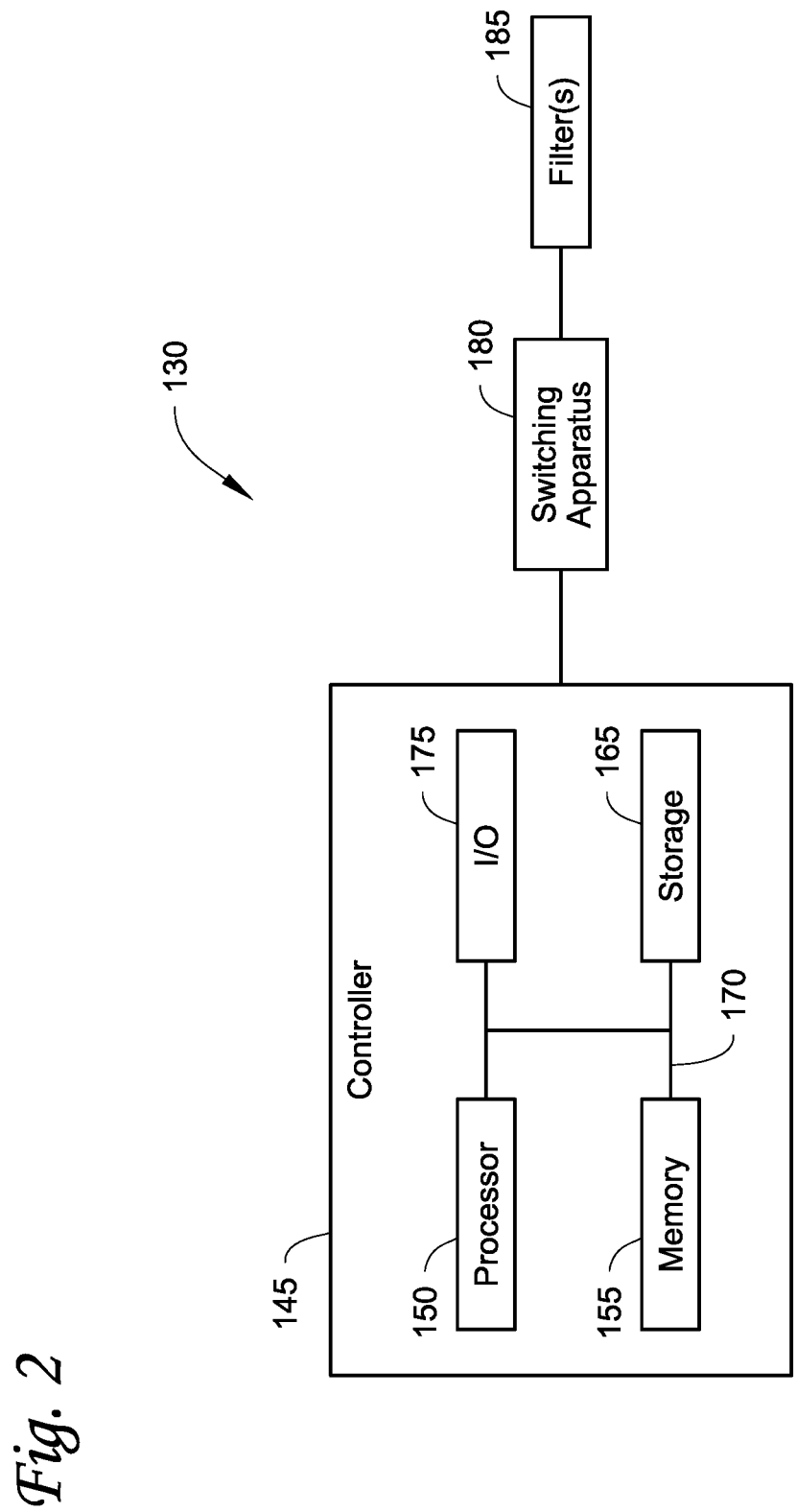
FIG. 2 illustrates a schematic diagram of a control system, according to an embodiment.

FIG. 2 illustrates a schematic diagram of a control system 130, according to an embodiment. The control system 130 includes a controller 145 configured to control a switching apparatus 180. The switching apparatus 180 is configured to switch the filter(s) 185 e.g., into or out of an active airflow path, and/or to move or rotate the filter(s) 185 in a predetermined direction. The switching apparatus 180 and the filter(s) 185 are described in detail in FIGS. 4-13.

The controller 145 is generally representative of hardware aspects of a controller for the refrigerant circuit 100 (FIG. 1). The controller 145 is an example and is not intended to be limiting. The controller 145 includes a processor 150, a memory 155, input/output 160, and storage 165. It is to be appreciated that the controller 145 can include one or more additional components.

The processor 150 can retrieve and execute programming instructions stored in the memory 155 and/or the storage 165. The processor 150 can also store and retrieve application data residing in the memory 155. The processor 150 can be a single processor, multiple processors, co-processors, or a single processor having multiple processing cores. In some embodiments, the processor 150 can be a single-threaded processor. In some embodiments, the processor 150 can be a multi-threaded processor.

An interconnect 170 is used to transmit programming instructions and/or application data between the processor 150, the memory 155, the storage 165, and the input/output 160. The interconnect 170 can, for example, be one or more busses or the like.

The memory 155 is generally included to be representative of a random access memory such as, but not limited to, Static Random Access Memory (SRAM), Dynamic Random Access Memory (DRAM), Flash, suitable combinations thereof, or the like. In some embodiments, the memory 155 can be a volatile memory. In some embodiments, the memory 155 can be a non-volatile memory.

The input/output 160 can include both wired and wireless connections. In an embodiment, the input/output 160 can transmit data and/or control signals via a wire line, an optical fiber cable, or the like.

Aspects described herein can be embodied as a system, method, or computer readable medium. In an embodiment, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result.

Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Figure 3:
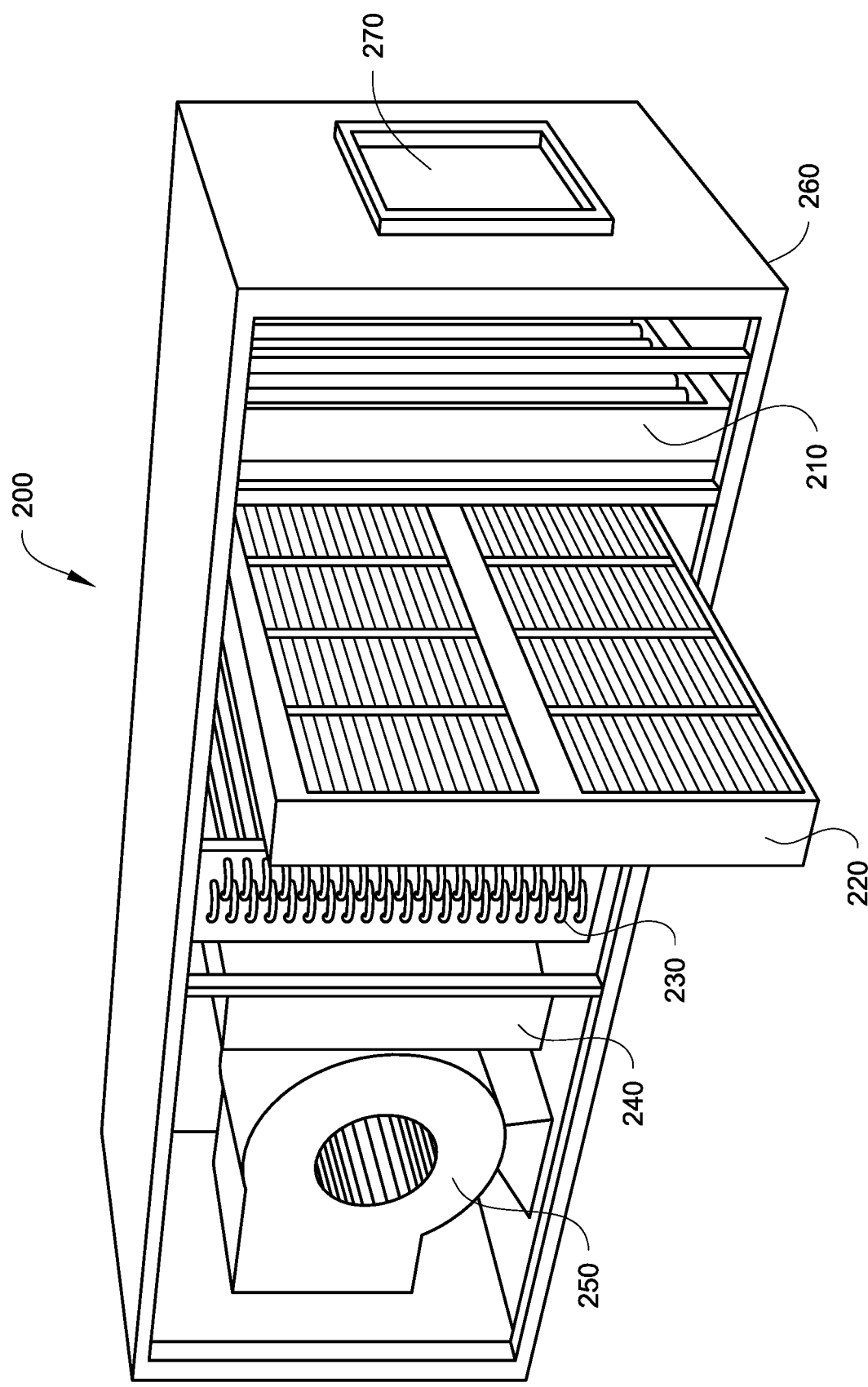
FIG. 3 illustrates a perspective view, partially cutaway, illustrating an air handling unit of an HVACR system, according to an embodiment.

FIG. 3 is a perspective view, partially cutaway, illustrating an air handling unit (air handler) 200 of an HVACR system, according to an embodiment.

The unit 200 includes an enclosure 260. In one embodiment, the enclosure 260 can be a generally rectangular cabinet having a first end wall defining an air inlet opening 270 (to allow air to flow into an internal space of the enclosure 260) and a second end wall defining an air outlet opening (not shown, to allow air to flow out of the enclosure 260 via an air outlet (that overlaps with the air outlet opening) of a fan 250). In FIG. 3, a side wall of the enclosure 260 is cutaway and the internal space of the enclosure 260 is shown.

The unit 200 also includes a primary filter 210 and a secondary filter 220. In one embodiment, the primary filter 210 and the secondary filter 220 can be one filter. It will be appreciated that the primary filter 210 and/or the secondary filter 220 can be a porous device configured to remove impurities or solid particles from air flow passed through the device.

The unit 200 further includes a component (e.g., a coil) 230. In one embodiment, the component 230 can be an air conditioning evaporator coil disposed in the flow path of air passing from the air inlet opening 270 to the air outlet opening of the enclosure 260 (which is also the air outlet of the fan 250). It will be appreciated that the component 230 can be different types in that the working fluid can be e.g., refrigerant, water, or the like. For example, when the working fluid is refrigerant, the component 230 can be an evaporator coil for cooling, and/or can be a condenser coil for heating. For example, when the working fluid is water, the component 230 can be tube(s) for chilled water to go through for cooling, and can be tube(s) for hot water to go through for heating.

In an embodiment, the unit 200 also includes a humidifier 240 configured to add moisture to the air to prevent dryness that can cause irritation in many parts of the human body or to increase humidity in the air.

Also the unit 200 includes a fan (or blower) 250. In one embodiment, the fan 250 can be a centrifugal fan having electric drive motor (not shown) to drive the fan 250 (e.g., to drive a shaft of the fan 250, to rotate the impeller of the fan 250, etc.). It will be appreciated that a centrifugal fan is a mechanical device for moving air or other gases toward the outlet of the fan in a direction at an angle (e.g., perpendicular) to the incoming air from the inlet of the fan. A centrifugal fan often contains a ducted housing to direct outgoing air in a specific direction or across a heat sink. The centrifugal fan can increase the speed and volume of an air stream with rotating impellers.

FIGS. 4-13 illustrate schematic diagrams of various switchable filtration systems, respectively, according to some embodiments. Each filtration system includes a switching apparatus (see 180 of FIG. 2). In an embodiment, the switching apparatus can be a damper, a valve, a gate, or any other suitable air diverter. In another embodiment, the switching apparatus can be an apparatus (e.g., an arm, a support bar, or any suitable mechanical hardware, parts, assembly, or machine with necessary motor and/or mechanism to move or rotate filters) that moves or rotates the filter(s) in a predetermined direction.

Figure 4:
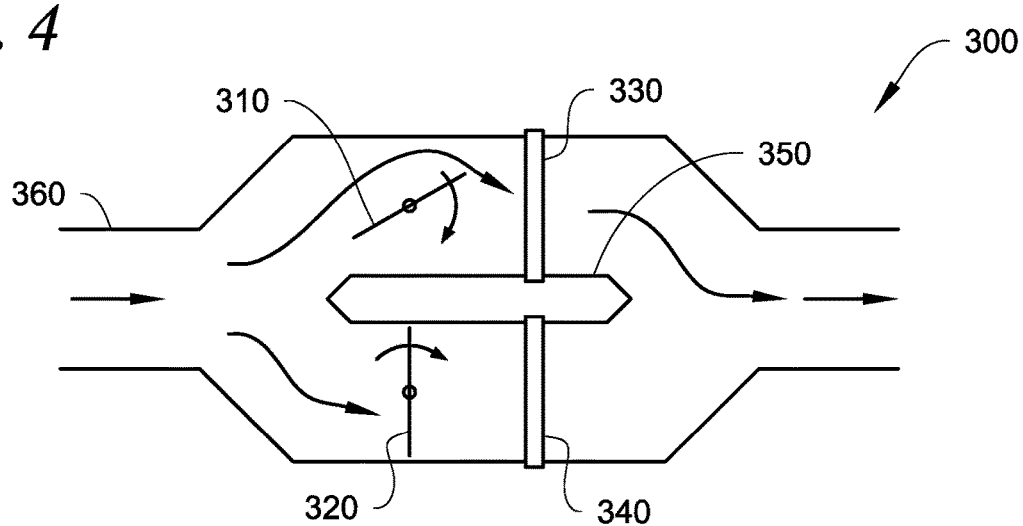
FIGS. 4-13 illustrate schematic diagrams of various switchable filtration systems, respectively, according to some embodiments.

FIG. 4 illustrates a schematic diagram of a switchable filtration system 300, according to an embodiment. The filtration system 300 includes a switching apparatus (310, 320), a first filter 330, a second filter 340, a separator 350, a duct 360, and a controller (e.g., 145 of FIG. 2). In an embodiment, the switching apparatus (310, 320) can include a first damper 310 disposed upstream of the first filter 330, and a second damper 320 disposed upstream of the second filter 340. It will be appreciated that one or more of the filter(s) can be a particulate filter for filtering particulate matter or a gaseous filter for filtering e.g., volatile organic compounds.

In an embodiment, the separator 350 is disposed in the middle (or around the middle) of the duct 360 separating the duct 360 into two half spaces (upper half and lower half). The first damper 310 and/or the first filter 330 extends from a first side of the separator 350 to an upper inner wall of the duct 360. The second damper 320 and/or the second filter 330 extends from a second side of the separator 350 to a lower inner wall of the duct 360.

The airflow (see arrows) passes into the duct 360. The controller can control the switching apparatus (310, 320) to switch the filters (330, 340) into or out of the active airflow path based on an air quality score.

It will be appreciated that in FIGS. 4-13, an air quality score can be determined (e.g., by the controller) based on, e.g., one or more of indoor air quality, ambient air quality, occupancy, a pre-determined time-based schedule, measured pressure drop across one or more filters, and/or other parameters.

Indoor (or ambient) air quality can be determined by parameters sensed by various sensors in the filtration system. The sensors may include sensor(s) detecting one or more of the amount, concentration (e.g., $mg/m^3$), and/or levels of $CO_2$, Volatile Organic Compounds (VOC), Particulate Matter (PM), $NO_2$, $SO_2$, relative humidity, levels of viruses or microbiologicals or pathogens, or any other suitable sensors. The sensed/detected parameters (data) can be sent to the controller. The air quality score can be determined, by the controller, based on the sensed indoor parameters.

For example, when the determined air quality score exceeds a predetermined threshold (indicating that the air quality is good enough, e.g., PM2.5, PM10, or similar sensed data go below a preset threshold), the controller can select (or control the switching apparatus to switch) a lower rated, low efficiency, and/or low pressure drop filter into the active airflow path to reduce energy consumption when a "better" filter is not required. When the determined air quality score is at or below the predetermined threshold (indicating that the air quality is not good enough, e.g., PM2.5, PM10, or similar sensed data suggest that a higher rated, higher efficiency, and/or higher pressure drop filter is required), the controller can select (or control the switching apparatus to switch) an HEPA filter into the active airflow path.

Similarly, when the determined air quality score is at or below the predetermined threshold (indicating that the air quality is not good enough, e.g., TVOCs (the total concentration of multiple VOCs present simultaneously in the air), $NO_2$, or other pollutant(s) are detected in the space and exceeds a preset threshold), the controller can select (or control the switching apparatus to switch) an appropriate filter, such as for example an activated charcoal or similar filter into the active airflow path. When the determined air quality score exceeds a predetermined threshold (indicating that the air quality is good enough, e.g., those pollutant is no longer observed in the space above the preset threshold), the controller can select (or control the switching apparatus to switch) an appropriate filter for example of a lower rated, lower efficiency, lower cost, and/or lower pressure drop filter into the active airflow path.

It will be appreciated that the predetermined threshold can be programmable, or be determined based on e.g., building guidelines such as WELL (a performance-based standard for measuring, certifying, and monitoring features of the built environment that impact human health and wellbeing, through air, water, nourishment, light, fitness, comfort, and mind), Environmental Protection Agency (EPA), etc.

For ambient air quality, similarly, a filtration system for outside air can be deployed in a selective fashion based on sensed/measured or reported ambient air quality (directly onsite, or through an ambient air quality data service) data. The sensed/measured parameters (data) can be sent to the controller. The air quality score can be determined, by the controller, based on the sensed/measured ambient air quality data. When the determined air quality score is at or below a predetermined threshold (indicating that the ambient air quality is not good enough, e.g., PM2.5 is high (for example if there is an active forest fire affecting the air quality in the region), the controller can select (or control the switching apparatus to switch) a higher rated filter (to ensure filtration of PM2.5 before using to condition an interior space) into the active airflow path. When the determined air quality score exceeds a predetermined threshold (indicating that the air quality is good enough), the controller can select (or control the switching apparatus to switch) a lower rated, low efficiency, less expensive, and/or lower pressure drop filter into the active airflow path to reduce overall cost.

Occupancy data can be determined based on a variety of occupancy detection methods (e.g., $CO_2$ level, occupant counting (the number of occupants), etc.). The determined occupancy data can be sent to the controller. The air quality score can be determined, by the controller, based on the determined occupancy data. When the determined air quality score is at or below a predetermined threshold (indicating that the ambient air quality is not good enough, e.g., when a preset number of humans are present in the space), the controller can select (or control the switching apparatus to switch) a higher rated filter into the active airflow path. When the determined air quality score exceeds a predetermined threshold (indicating that the air quality is good enough, e.g., during night or weekend hours, or any other typically unoccupied time), the controller can select (or control the switching apparatus to switch) a lower rated, low efficiency, less expensive, and/or lower pressure drop filter into the active airflow path.

Similarly, an air quality score can be determined, by the controller, based on the time-based schedule in lieu of active measurements. The controller can select (or control the switching apparatus to switch) a filter based on time of day, day of week, etc. An air quality score can also be determined, by the controller, based on the outside air/dilution versus filtration (i.e. using filtration optimized to the current outside air/dilution controls).

It will be appreciated that to prevent frequent switching of the filter(s) into and out of the active airflow path, a first predetermined threshold and a second predetermined threshold that is lower than the first predetermined threshold can be used. When the determined air quality score exceeds the first predetermined threshold, the controller can select (or control the switching apparatus to switch) the higher rated filter out of the active airflow path and/or select (or control the switching apparatus to switch) the lower rated filter into the active airflow path. When the determined air quality score is at or below the second predetermined threshold, the controller can select (or control the switching apparatus to switch) the lower rated filter out of the active airflow path and/or select (or control the switching apparatus to switch) the higher rated filter into the active airflow path.

Referring back to FIG. 4, the airflow (see arrows) passes into the duct 360. In an embodiment, when the determined air quality score exceeds a predetermined threshold (i.e., the air quality is good enough), the controller controls the first damper 310 to block airflow to the first filter 330 (i.e., switching the first filter out of the active airflow path), and controls the second damper 320 to allow airflow to the second filter 340 (i.e., switching the second filter into the active airflow path). When the determined air quality score is at or below the predetermined threshold (i.e., the air quality is not good enough), the controller controls the first damper 310 to allow airflow to the first filter 330 (i.e., switching the first filter into the active airflow path), and controls the second damper 320 to block airflow to the second filter 340 (i.e., switching the second filter out of the active airflow path).

Figure 5:
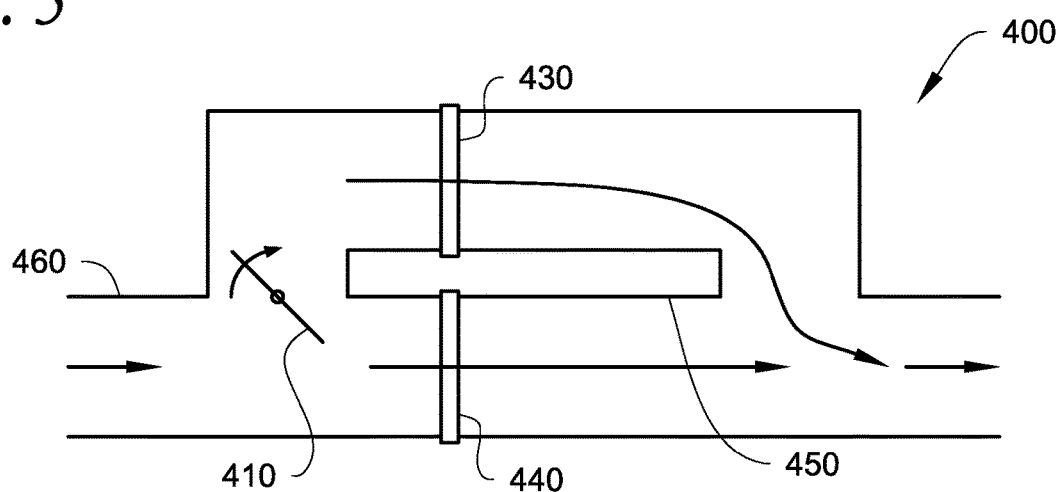

FIG. 5 illustrates a schematic diagram of a switchable filtration system 400, according to another embodiment. The filtration system 400 includes a switching apparatus (410), a first filter 430, a second filter 440, a separator 450, a duct 460, and a controller (e.g., 145 of FIG. 2). In an embodiment, the switching apparatus 410 is a damper disposed upstream of the first filter 430 and the second filter 440.

In an embodiment, the separator 450 is disposed in, at, or around the middle of the duct 460. The first filter 430 extends from a first side of the separator 450 to an upper inner wall of the duct 360. The second filter 440 extends from a second side of the separator 450 to a lower inner wall of the duct 460. The damper 410 extends from an end of the separator 450 to a side wall of the duct 460.

The controller can control the switching apparatus 410 to switch the filter 430 into or out of the active airflow path based on an air quality score.

The airflow (see arrows) passes into the duct 460. In an embodiment, the second filter 440 has a higher pressure drop or a higher efficiency, or is rated higher than the first filter 430. When the determined air quality score exceeds a predetermined threshold (i.e., the air quality is good enough), the controller controls the damper 410 to allow airflow to the first filter 430 (i.e., switching the first filter into the active airflow path). The second filter 440 is also in the active airflow path. That is, the active airflow path can include both the active airflow path the first filter 430 is in, and the active airflow path the second filter 440 is in. When the determined air quality score exceeds the predetermined threshold (i.e., the air quality is not good enough), the controller controls the damper 410 to block airflow to the first filter 430 (i.e., switching the first filter out of the active airflow path). In such embodiment, the second filter 440 is always in the active airflow path because when the damper 410 is closed, the air can be forced to go through the higher pressure drop filter 440 because of the duct design (more air would flow to the lower portion of the duct 460 since the air does not change direction in the lower portion of the duct 460). It will be appreciated that if the first filter 430 has a higher efficiency than the second filter 440, when the damper 410 is open, most air would still flow through the second filter 440 and would not get to the first filter 430.

Figure 6:
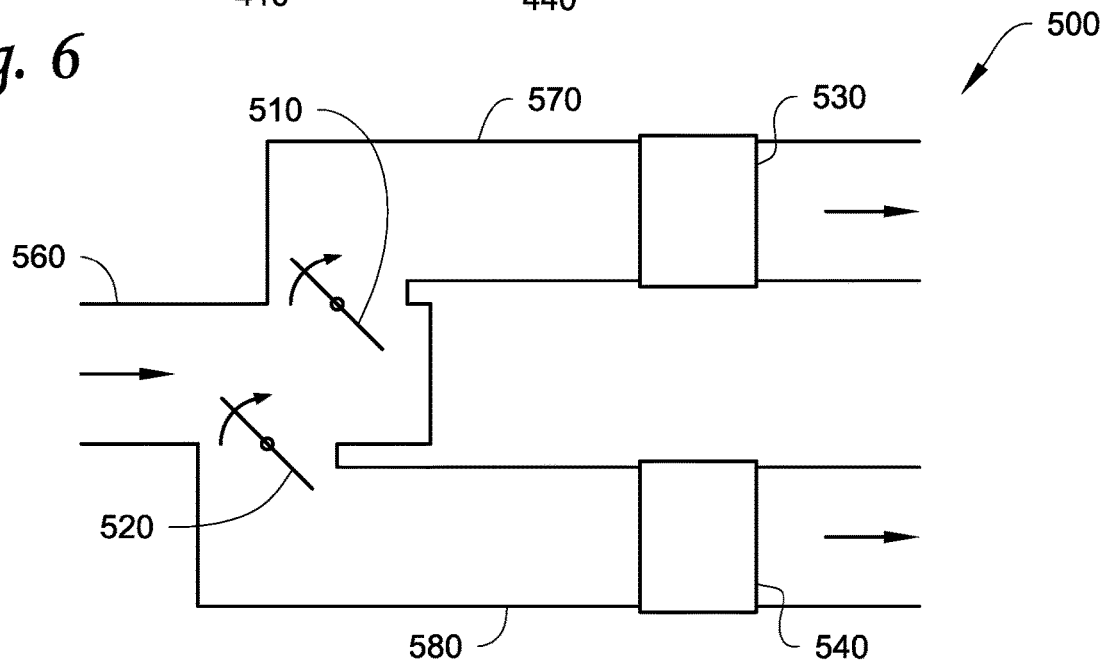

FIG. 6 illustrates a schematic diagram of a switchable filtration system 500, according to yet another embodiment. FIG. 6 is similar to FIG. 4, except that in FIG. 6, the first filter 530 is in a first air handler 570 and the second filter 540 is in a second air handler 580.

The filtration system 500 includes a switching apparatus (510, 520), a first filter 530, a second filter 540, a duct 360, and a controller (e.g., 145 of FIG. 2). In an embodiment, the switching apparatus (510, 520) can include a first damper 510 disposed upstream of the first filter 530, and a second damper 520 disposed upstream of the second filter 540.

The first damper 310 is disposed at and is configured to cover/block an opening of the first air handler 570. The first filter 530 extends from an upper inner wall to a lower inner wall of the first air handler 570. The second damper 510 is disposed at and is configured to cover/block an opening of the second air handler 580. The second filter 540 extends from an upper inner wall to a lower inner wall of the second air handler 580.

The airflow (see arrows) passes into the duct 560. The controller can control the switching apparatus (510, 520) to switch the filters (530, 540) into or out of the active airflow path based on an air quality score.

In an embodiment, when the determined air quality score exceeds a predetermined threshold (i.e., the air quality is good enough), the controller controls the first damper 510 to block airflow to the first filter 530 (i.e., switching the first filter out of the active airflow path), and controls the second damper 520 to allow airflow to the second filter 540 (i.e., switching the second filter into the active airflow path). When the determined air quality score is at or below the predetermined threshold (i.e., the air quality is not good enough), the controller controls the first damper 510 to allow airflow to the first filter 530 (i.e., switching the first filter into the active airflow path), and controls the second damper 520 to block airflow to the second filter 540 (i.e., switching the second filter out of the active airflow path).

Figure 7:
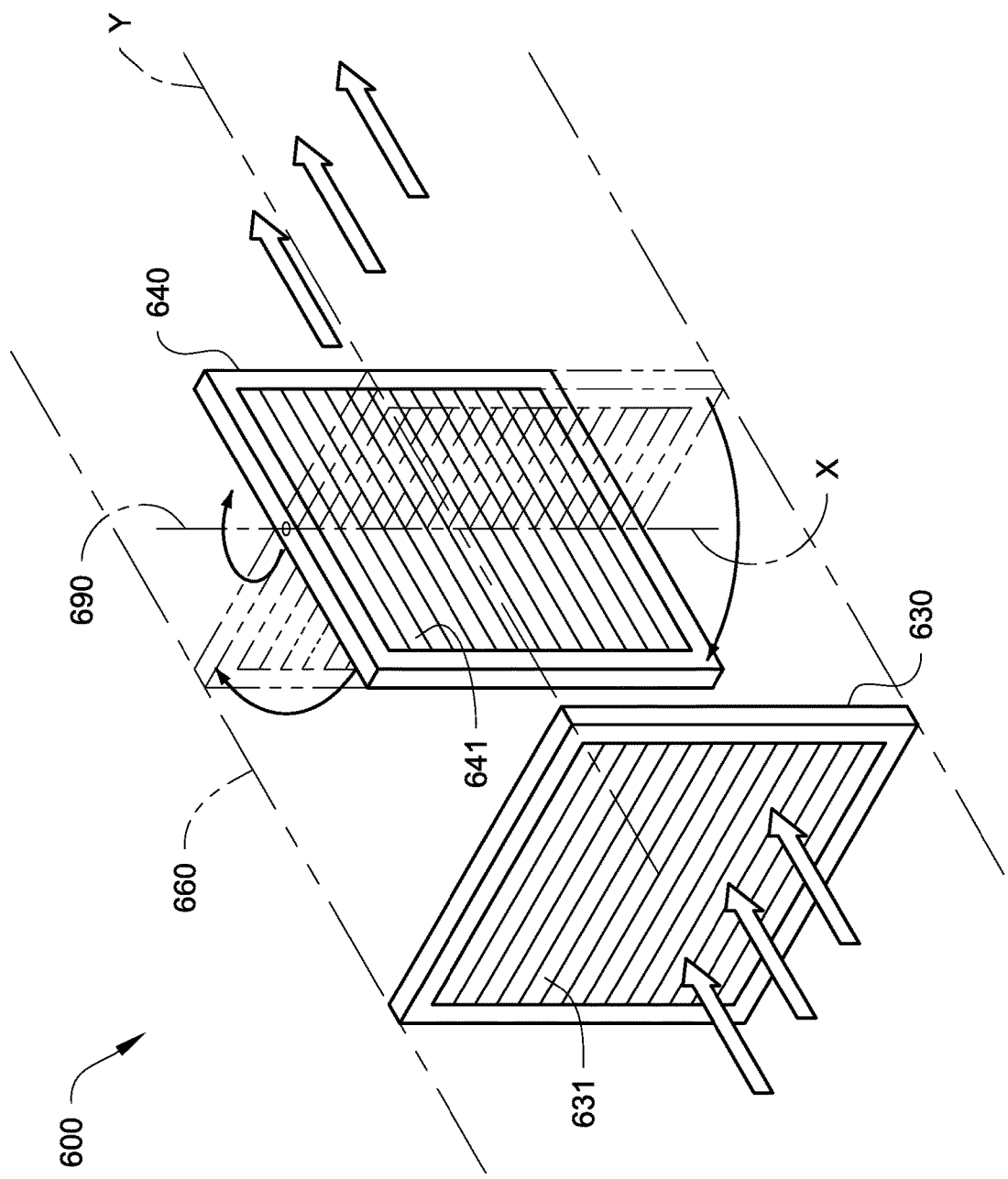

FIG. 7 illustrates a schematic diagram of a switchable filtration system 600, according to yet another embodiment.

The filtration system 600 includes a switching apparatus 690, a first filter 640, a second filter 630, a duct 660, and a controller (e.g., 145 of FIG. 2). The first filter 640 is disposed downstream of the second filter 630. In an embodiment, the first filter 640 can be disposed upstream of the second filter 630.

Each of the filters (630, 640) includes a main surface (631, 641) having a filtration material. The first filter 640 further includes a rotational axis that is substantially in parallel with the main surface 641. In an embodiment, the switching apparatus 690 can be e.g., an arm or a bar (or any suitable mechanical hardware, parts, assembly, or machine with necessary motor and/or mechanism to move or rotate filters) that is controlled by the controller (e.g., 145 of FIG. 2) along a rotational axis at around the middle of the first filter 640. In an embodiment, a first direction and a second direction can be perpendicular to each other and define the plane or the main surface 641 of the first filter 640. The first direction and the second direction are axes about which the first filter rotates. The first direction and the second direction can be anywhere between the edges of the first filter, other than in the center as described in the rest of the application. For example, the first direction can be at the vertical edge of the first filter and the second direction can be at the horizontal edge of the first filter. In another embodiment, the first direction can be at the horizontal edge of the first filter and the second direction can be at the vertical edge of the first filter. In an embodiment, the switching apparatus 690 extends in a vertical direction (X) that is substantially in parallel with the main surface 641. In another embodiment, the switching apparatus 690 extends in a horizontal direction (Y) that is substantially in parallel with the airflow (see block arrows).

The airflow (see block arrows) passes into the duct 660. The controller can control the switching apparatus 690 to switch the first filter 640 into or out of the active airflow path based on an air quality score.

In an embodiment, when the determined air quality score exceeds a predetermined threshold (i.e., the air quality is good enough), the controller controls the switching apparatus 690 to rotate the first filter 640 (see line arrows, i.e., switching the first filter out of the active airflow path) so that the main surface of the first filter 640 is substantially in parallel with a direction of the airflow. It will be appreciated that "switching the first filter out of the active airflow path" in this embodiment refers to a condition that the first filter 640 is still physically stay in the airflow path but the airflow does not flow through the filtration material. When the determined air quality score is at or below the predetermined threshold (i.e., the air quality is not good enough), the controller controls the switching apparatus 690 to rotate the first filter 640 (i.e., switching the first filter into the active airflow path) so that the main surface of the first filter 640 is substantially perpendicular to the direction of the airflow (and faces a cross-sectional area of the duct 660). In an embodiment, the main surface of the second filter 630 is always disposed substantially perpendicular to the direction of the airflow (i.e., in the active airflow path).

Figure 8:
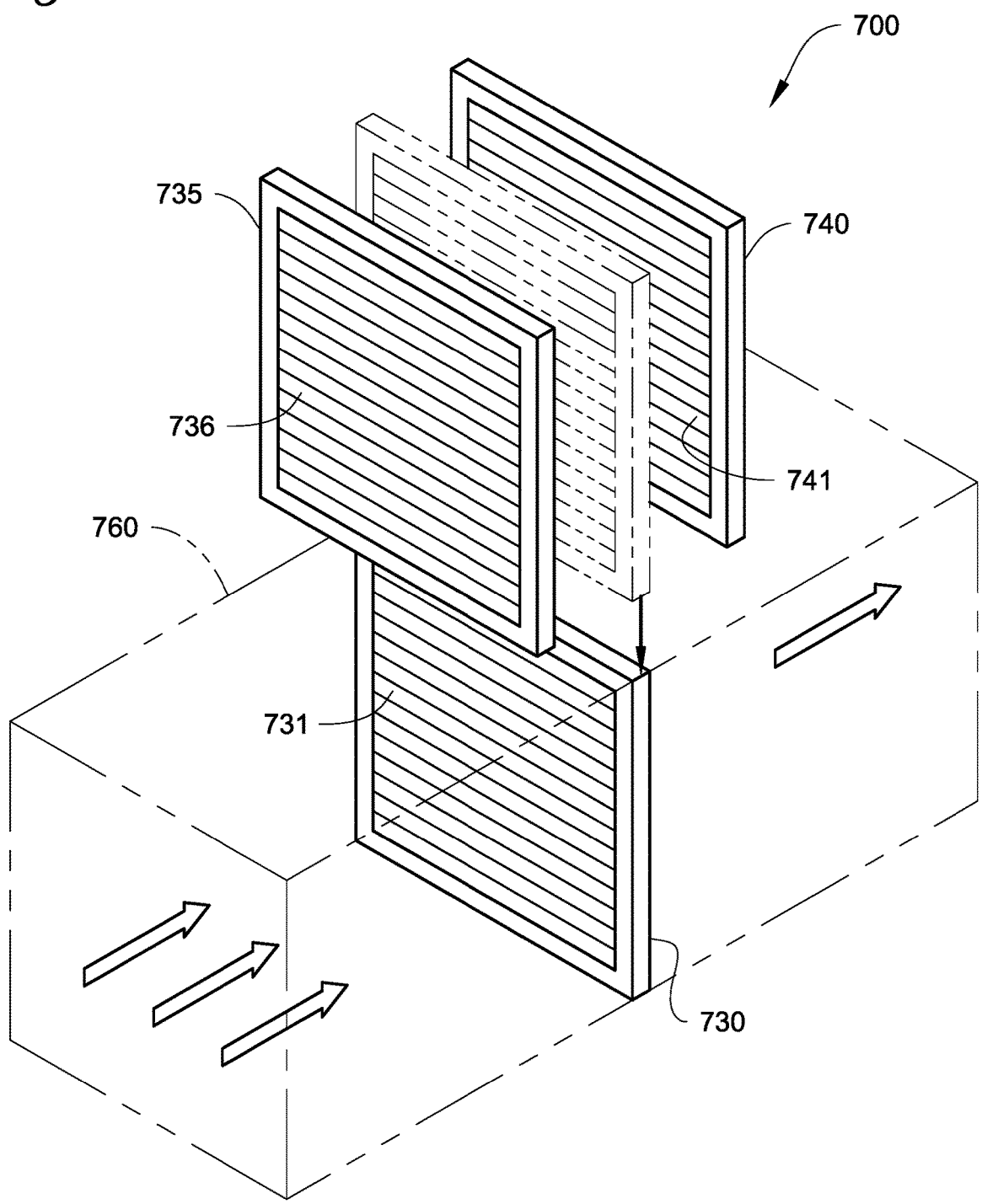

FIG. 8 illustrates a schematic diagram of a switchable filtration system 700, according to yet another embodiment.

The filtration system 700 includes a switching apparatus (see 180 of FIG. 2), a first filter 730, a second filter 740, a duct 760, and a controller (e.g., 145 of FIG. 2). The first filter 730 is disposed upstream of the second filter 740. In an embodiment, the first filter 730 can be disposed downstream of the second filter 740. In an embodiment, the filtration system 700 may include other filters 735.

Each of the filters (730, 735, 740) includes a main surface (731, 736, 741) having a filtration material. The switching apparatus (e.g., an arm, a bar, or any suitable mechanical hardware, parts, assembly, or machine with necessary motor and/or mechanism to move or rotate filters) can be configured to move the filters (730, 735, 740) into and out of an active airflow path in a direction substantially perpendicular to the direction of the airflow. FIG. 8 shows that the filter 730 is moved from a previous location (represented by the dotted lines) to the current location (by the switching apparatus controlled by a controller). The main surface (731, 736, 741) of each of the filters (730, 735, 740) is disposed in the direction substantially perpendicular to the direction of the airflow.

The airflow (see block arrows) passes into the duct 760. The controller can control the switching apparatus to switch the filters (730, 735, 740) into or out of the active airflow path based on an air quality score.

In an embodiment, when the determined air quality score exceeds a predetermined threshold (i.e., the air quality is good enough), the controller controls the switching apparatus to move the first filter 730 out of the active airflow path (so that no airflow flows through the first filter 730) in the direction substantially perpendicular to the direction of the airflow, and controls the switching apparatus to move the second filter 740 into the active airflow path in the direction substantially perpendicular to the direction of the airflow to face the airflow. When the determined air quality score is at or below the predetermined threshold (i.e., the air quality is not good enough), the controller controls the switching apparatus to move the first filter 730 into the active airflow path to face the airflow in the direction substantially perpendicular to the direction of the airflow, and controls the switching apparatus to move the second filter 740 out of the active airflow path in the direction substantially perpendicular to the direction of the airflow (so that no airflow flows through the first filter 730).

Figure 9:
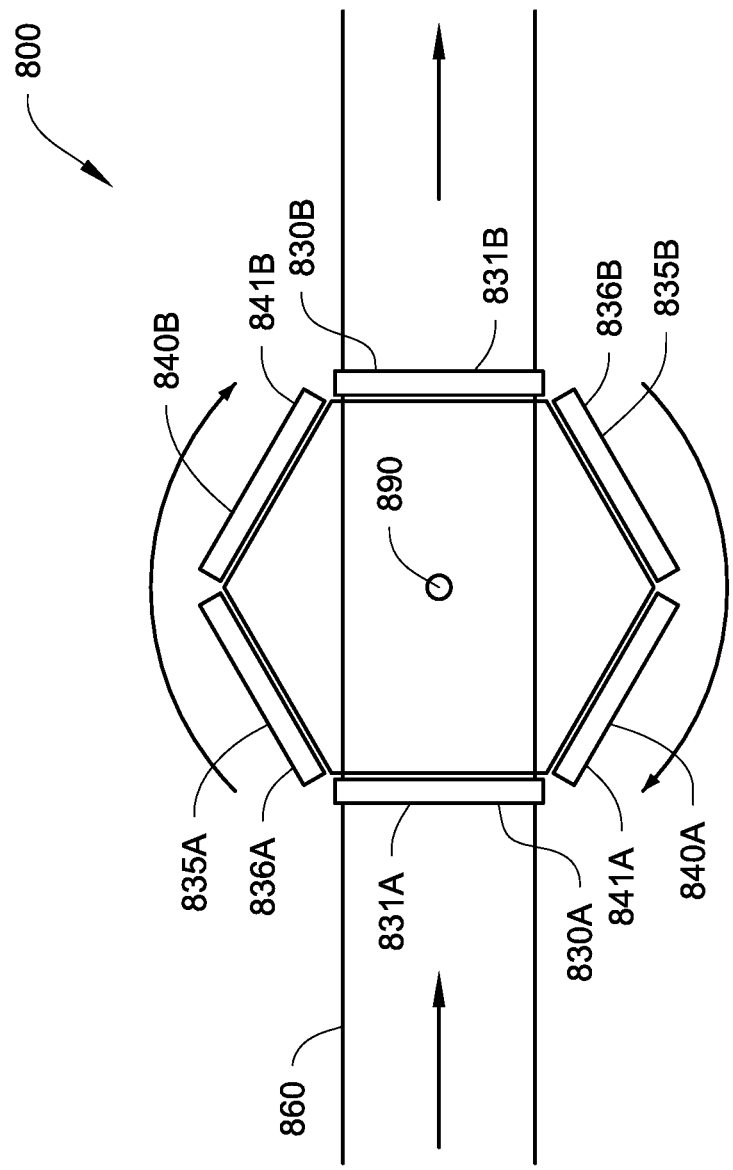

FIG. 9 illustrates a schematic diagram of a top view of a switchable filtration system 800, according to yet another embodiment.

The filtration system 800 includes a first set of filters (830A, 830B), a second set of filters (840A, 840B), a duct 860, and a controller (e.g., 145 of FIG. 2). In an embodiment, the filtration system 800 may include other set(s) of filters (835A, 835B). The filtration system 800 also includes a switching apparatus. In an embodiment, the switching apparatus can be a carousel (e.g., having a hexagon shape) rotatable around a rotational axis 890 (at or around the middle of the carousel that is substantially perpendicular to a direction of the active airflow path). The first set of filters (830A, 830B) are disposed at opposite sides (e.g., with main surfaces facing each other) of the carousel, respectively. The second set of filters (840A, 840B) are disposed at opposite sides (e.g., with main surfaces facing each other) of the carousel (adjacent to the first set of filters 830A, 830B), respectively. The other set of filters (835A, 835B) are disposed at opposite sides (e.g., with main surfaces facing each other) of the carousel (adjacent to the first set of filters 830A, 830B and the second set of filters 840A, 840B), respectively.

Each of the filters (830A, 830B, 835A, 835B, 840A, 840B) includes a main surface (831A, 831B, 836A, 836B, 841A, 841B) having a filtration material. The switching apparatus can be configured to move the filters (830A, 830B, 835A, 835B, 840A, 840B) into and out of an active airflow path by rotating around the axis 890. The main surface (831A, 831B, 836A, 836B, 841A, 841B) of each of the filters (830A, 830B, 835A, 835B, 840A, 840B) is disposed in the direction substantially perpendicular to the direction of the airflow when the corresponding filter is rotated into the active airflow path. In an embodiment, the switching apparatus may include a frame having a hexagon shape (six sides), each side of the frame supporting a filter, and each side of the frame connected to an arm or a bar (or any suitable mechanical hardware, parts, assembly, or machine with necessary motor and/or mechanism to move or rotate filters) the axis 890. The switching apparatus can be configured to move the filters (830A, 830B, 835A, 835B, 840A, 840B) into and out of the active airflow path by rotating the arm or the bar (or any suitable mechanical hardware, parts, assembly, or machine with necessary motor and/or mechanism to move or rotate filters) around the axis 890.

The airflow (see arrows) passes into the duct 860. The controller can control the switching apparatus to switch the filters (830A, 830B, 835A, 835B, 840A, 840B) into or out of the active airflow path based on an air quality score.

In an embodiment, when the determined air quality score exceeds a predetermined threshold (i.e., the air quality is good enough), the controller controls the switching apparatus to rotate the first set of filters (830A, 830B) out of the active airflow path (so that no airflow flows through the first set of filters), and controls the switching apparatus to rotate the second set of filters (840A, 840B) into the active airflow path to face the airflow. When the determined air quality score is at or below the predetermined threshold (i.e., the air quality is not good enough), the controller controls the switching apparatus to rotate the first set of filters (830A, 830B) into the active airflow path to face the airflow, and controls the switching apparatus to rotate the second set of filters (840A, 840B) out of the active airflow path (so that no airflow flows through the second set of filters).

Figure 10:
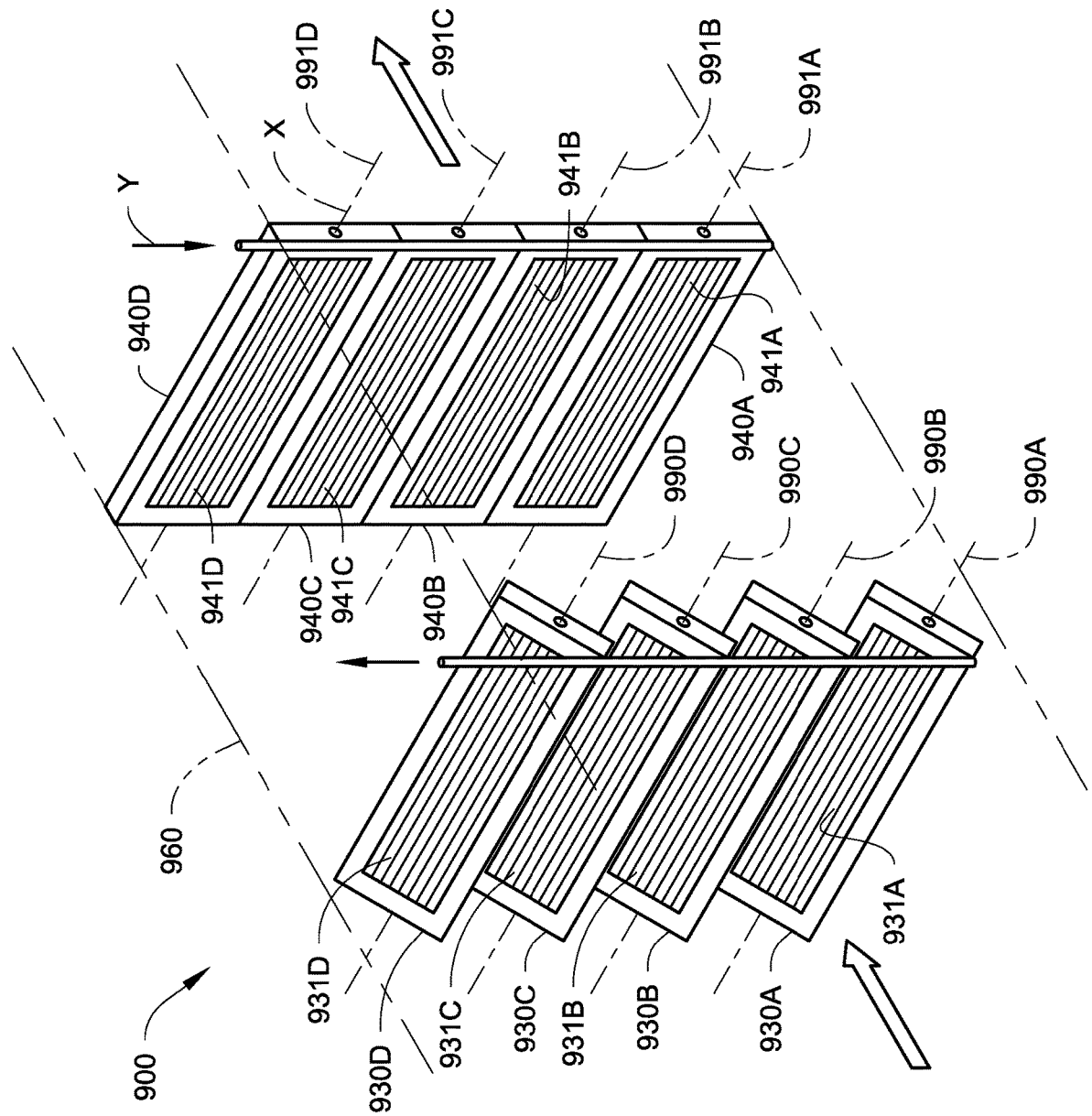

FIG. 10 illustrates a schematic diagram of a switchable filtration system 900, according to yet another embodiment.

The filtration system 900 includes a switching apparatus (990A-990D, 991A-991D), a first set of filters (930A-930D), a second set of filters (940A-940D), a duct 960, and a controller (e.g., 145 of FIG. 2). The first set of filters (930A-930D) are disposed upstream of the second set of filters (940A-940D). In an embodiment, the first set of filters (930A-930D) can be disposed downstream of the second set of filters (940A-940D).

Each of the filters (930A-930D, 940A-940D) includes a main surface (931A-931D, 941A-941D) having a filtration material. Each of the first filters includes a switching apparatus (990A-990D, 991A-991D) that is substantially in parallel with the main surface (931A-931D, 941A-941D). In an embodiment, the switching apparatus (990A-990D, 991A-991D) can be an arm or a bar (or any suitable mechanical hardware, parts, assembly, or machine with necessary motor and/or mechanism to move or rotate filters) along a rotational axis at around the middle of the filters. In an embodiment, the switching apparatus (990A-990D, 991A-991D) extends in a horizontal direction (X) that is substantially in parallel with the main surface (931A-931D, 941A-941D). In another embodiment, the switching apparatus extends in a vertical direction (Y) that is substantially perpendicular to X.

The airflow (see block arrows) passes into the duct 960. The controller can control the switching apparatus (990A-990D, 991A-991D) to switch the filters (930A-930D, 940A-940D) into or out of the active airflow path based on an air quality score.

In an embodiment, when the determined air quality score exceeds a predetermined threshold (i.e., the air quality is good enough), the controller controls the rotational axis (990A-990D) to rotate the first set of filters (930A-930D) (i.e., switching the first set of filters out of the active airflow path) so that the main surfaces of the first set of filters (930A-930D) are substantially in parallel with a direction of the airflow, and controls the rotational axis (991A-991D) to rotate the second set of filters (940A-940D) (i.e., switching the second set of filters into the active airflow path) so that the main surfaces of the second set of filters (940A-940D) are substantially perpendicular to the direction of the airflow (and facing a cross-sectional area of the duct 960). When the determined air quality score is at or below the predetermined threshold (i.e., the air quality is not good enough), the controller controls the rotational axis (990A-990D) to rotate the first set of filters (930A-930D) (i.e., switching the first set of filters into the active airflow path) so that the main surfaces of the first set of filters (930A-930D) are substantially perpendicular to the direction of the airflow (and facing a cross-sectional area of the duct 960), and controls the rotational axis (991A-991D) to rotate the second set of filters (940A-940D) (i.e., switching the second set of filters out of the active airflow path) so that the main surfaces of the second set of filters (940A-940D) are substantially in parallel with the direction of the airflow.

Figure 11:
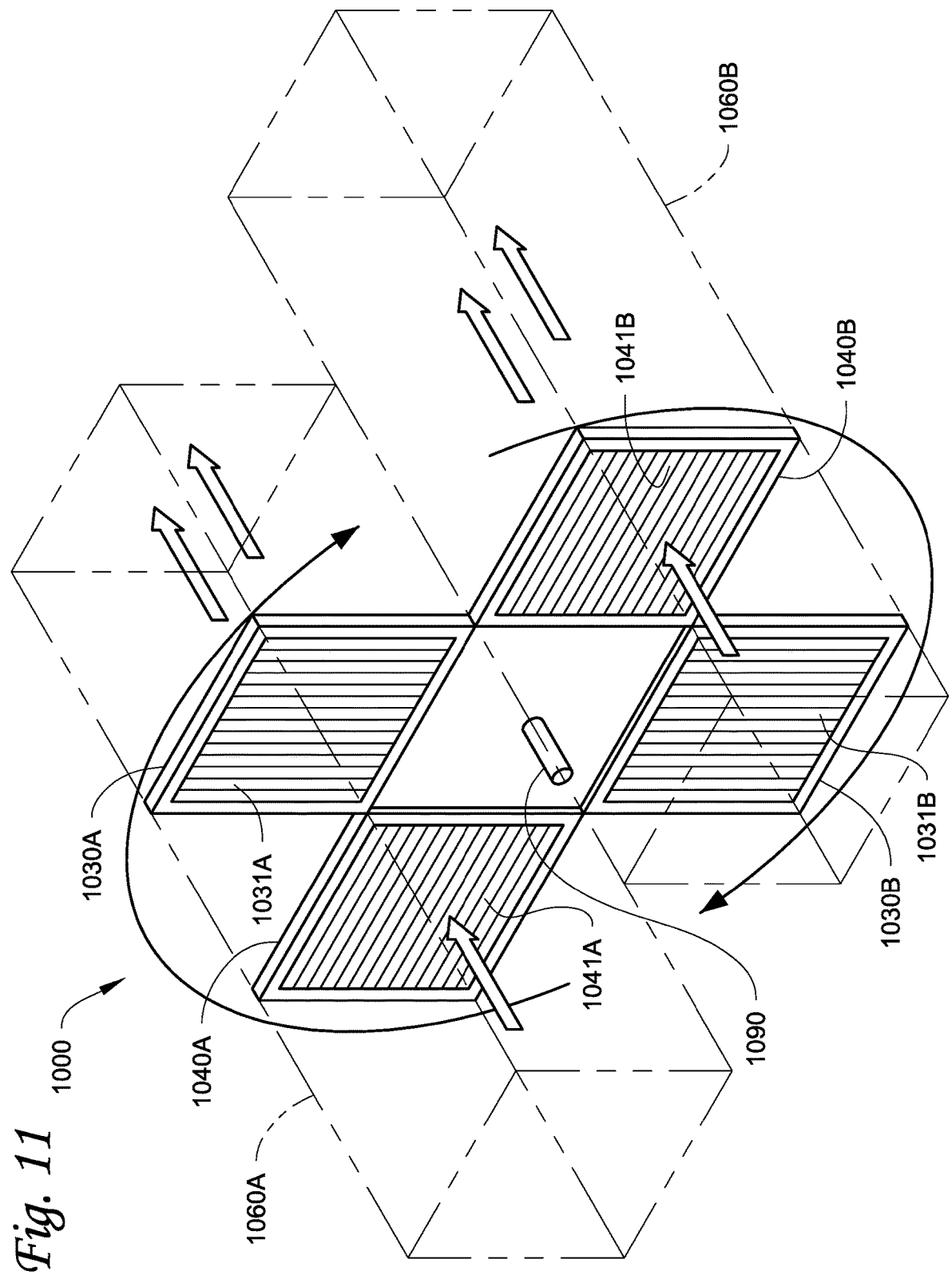

FIG. 11 illustrates a schematic diagram of a switchable filtration system 1000, according to yet another embodiment.

The filtration system 1000 includes a first set of filters (1030A, 1030B), a second set of filters (1040A, 1040B), a duct 1060A, and a controller (e.g., 145 of FIG. 2). In an embodiment, the filtration system 1000 may include another duct 1060B. The filtration system 1000 also includes a switching apparatus. In an embodiment, the switching apparatus can be a wheel (e.g., a desiccant wheel) rotatable around a rotational axis 1090 (at or around the middle of the wheel that is substantially in parallel with a direction of the active airflow path). In an embodiment, the switching apparatus may include a frame having a cross shape (four sides), each side of the frame supporting a filter, and each side of the frame connected to an arm or a bar (or any suitable mechanical hardware, parts, assembly, or machine with necessary motor and/or mechanism to move or rotate filters) along the axis 1090. The switching apparatus can be configured to move the filters (1030A, 1030B, 1040A, 1040B) into and out of the active airflow path by rotating the arm or the bar (or any suitable mechanical hardware, parts, assembly, or machine with necessary motor and/or mechanism to move or rotate filters) around the axis 1090. The first set of filters (1030A, 1030B) are disposed at opposite sides (e.g., with main surfaces aligning with and in parallel with each other) of the wheel, respectively. The second set of filters (1040A, 1040B) are disposed at opposite sides (e.g., with main surfaces aligning with and in parallel with each other) of the wheel (adjacent to the first set of filters 1030A, 1030B), respectively.

Each of the filters (1030A, 1030B, 1040A, 1040B) includes a main surface (1031A, 1031B, 1041A, 1041B) having a filtration material. The switching apparatus can be configured to move the filters (1030A, 1030B, 1040A, 1040B) into and out of an active airflow path by rotating around the axis 1090. The main surface (1031A, 1031B, 1041A, 1041B) of each of the filters (1030A, 1030B, 1040A, 1040B) is disposed in the direction substantially perpendicular to the direction of the airflow when the corresponding filter is rotated into or out of the active airflow path.

The airflow (see arrows) passes into the ducts (1060A, 1060B). The controller can control the switching apparatus to switch the filters (1030A, 1030B, 1040A, 1040B) into or out of the active airflow path based on an air quality score.

In an embodiment, when the determined air quality score exceeds a predetermined threshold (i.e., the air quality is good enough), the controller controls the switching apparatus to rotate the first set of filters (1030A, 1030B) out of the active airflow path (so that no airflow flows through the first set of filters) of the duct 1060A (or 1060B), and controls the switching apparatus to rotate the second set of filters (1040A, 1040B) into the active airflow path of the duct 1060A (or 1060B) to face the airflow. When the determined air quality score is at or below the predetermined threshold (i.e., the air quality is not good enough), the controller controls the switching apparatus to rotate the first set of filters (1030A, 1030B) into the active airflow path of the duct 1060A (or 1060B) to face the airflow, and controls the switching apparatus to rotate the second set of filters (1040A, 1040B) out of the active airflow path (so that no airflow flows through the second set of filters) of the duct 1060A (or 1060B).

Figure 12:
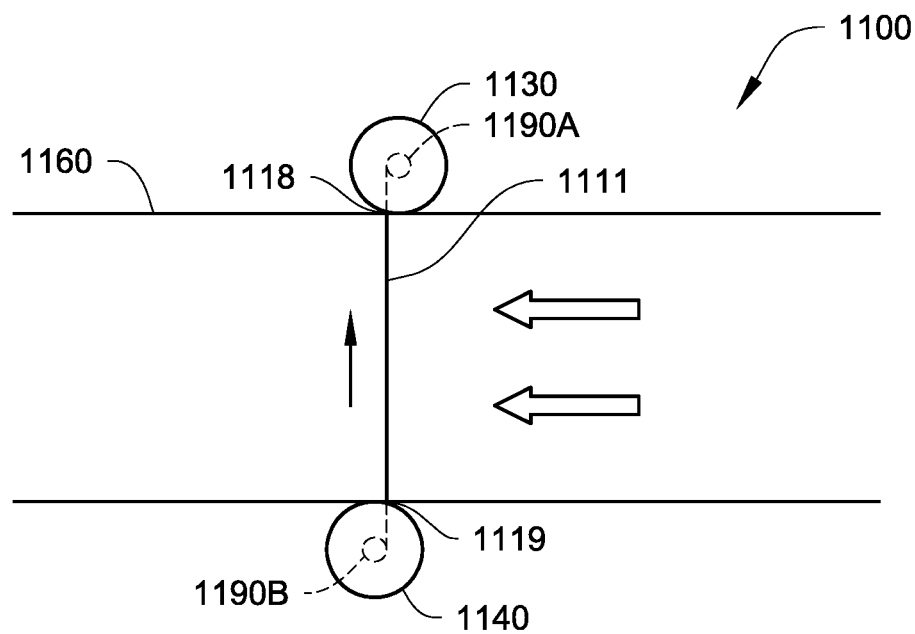

FIG. 12 illustrates a schematic diagram of a filtration system 1100, according to yet another embodiment.

The filtration system 1100 includes a film or filtration media (or material) 1111 configured in a form of a roll 1130, 1140 (or scroll). One or both ends of the roll include axis (1190A, 1190B) extending in a direction that is substantially in parallel with a width direction (into and out of the paper as shown in FIG. 12) of the media 1111. The roll includes an unused (clean) roll 1140 having a rolling axis 1190B and a used (contaminated) roll 1130 having a rolling axis 1190A. The axis (1190A, 1190B) can be configured to e.g., unwind the clean roll 1140 to release clean media to expose to and face a cross-sectional area of the duct 1160, and rewind the contaminated roll 1130 to fold the contaminated media. Each roll (1130, 1140) can have multiple yards or more media in length.

The airflow (see block arrows) passes into the duct 1160. The duct 1160 can be the ducts of FIGS. 4-6 having a switching apparatus (e.g., a damper) disposed upstream of the media 1111 and configured to switch the media 1111 into or out of an active airflow. For example, when the determined air quality score exceeds a predetermined threshold, a controller (e.g., 145 of FIG. 2) controls the switching apparatus to block airflow to the media 1111. When the determined air quality score is at or below the predetermined threshold, the controller controls the switching apparatus to allow airflow to the media 1111.

It will be appreciated that the rolls (1130, 1140) can be disposed outside of the duct 1160 except the released/unwound media. As such, a sealing mechanism (at or near 1118, 1119) at where the media enters the duct 1160 (via openings at or near 1118, 1119 in the duct 1160 to allow the media to pass from/to the rolls) may be needed. The sealing mechanism can be an actuated sealing device against the media 1111 or rollers (1130, 1140) to seal the duct 1160 off.

It will also be appreciated that both rollers (1130, 1140) can be clean rolls. The roll 1130 can include a first filtration media (or film or material), the roll 1140 can include a second media. The first media can be a higher rated, higher efficiency, higher cost, and higher pressure drop media than the second media. In an embodiment, when the determined air quality score exceeds a predetermined threshold, the controller controls a switching apparatus (e.g., the axis 1190A, 1190B) to rewind the first media into the roll 1130 and to unwind the second media from the roll 1140 to cover airflow to the duct 1160. When the determined air quality score is at or below the predetermined threshold, the controller controls the switching apparatus (e.g., the axis 1190A, 1190B) to unwind the first media from the roll 1130 to cover the duct 1160 and to rewind the second media into the roll 1140.

Figure 13:
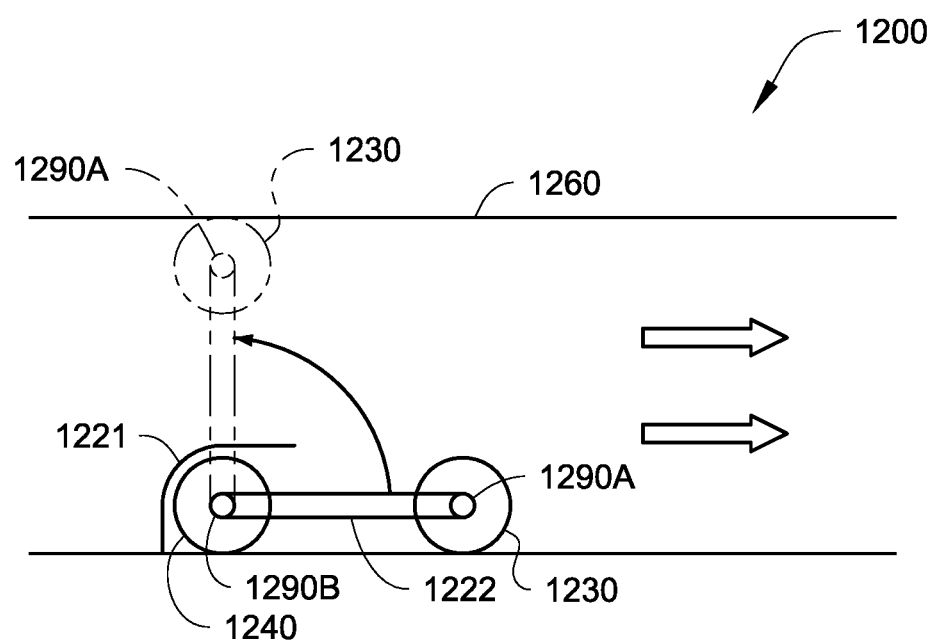

FIG. 13 illustrates a schematic diagram of a filtration system 1200, according to yet another embodiment. The filtration system 1200 can be the same (structure and/or function) as the filtration system 1100 of FIG. 12 except that (1) the rolls (1230, 1240) are disposed inside the duct 1260, that (2) an optional actuating arm 1222 is provided and configured to move the roll 1230, and that (3) optional guard(s) 1221 is/are provided and configured to prevent the unwound roll (1230, 1240) from exposure to the airflow.

The airflow (see block arrows) passes into the duct 1260. In an embodiment, when the determined air quality score exceeds a predetermined threshold, the controller (e.g., 145 of FIG. 2) controls the actuating arm 1222 to move the roll 1230 to a first position (a disengaged position) that is on a same side wall of the duct 1260 as the roll 1240 so that no airflow flows through the media between the rolls 1230 and 1240. The guard 1221 can direct the airflow around the rolls (1230, 1240) when the rolls are in the disengaged position. When the determined air quality score is at or below the predetermined threshold, the controller controls the actuating arm 1222 to move the roll 1230 to a second position (an engaged position) that is on an opposite side wall of the duct 1260 to the roll 1240 to allow airflow flows through the media between the rolls 1230 and 1240.

It will be appreciated that in operation, the contaminated roll can be processed or cleaned (e.g., using UV light on the contaminated media), or being placed for more than a predetermined period of time (e.g., 10 or more days) to get rid of pathogens (e.g., COVID-19) so that the rolls can be reused again. In another embodiment, the whole contaminated roll can be taken out and be replaced with a new clean roll. In an embodiment, a lower rated pre-filter that takes out bigger particles can be used in conjunction with the rolls (1130, 1140, 1230, 1240) with higher rated media. The media (material, filter, etc.) on the rolls may catch fine particles that the pre-filter cannot catch. Embodiments disclosed herein can reduce maintenance cost for replacement of filters. The entire roll can have the same higher rated material (e.g., material used for making face masks) that have capture qualities but have higher pressure drop.

In operation, the air quality score can be represented by one or more of parameters based on different operational modes. For example, for unoccupied (by residents such as humans, animals, plants, etc.) heat or cool, during unoccupied times, if a space or spaces (air quality score) exceed the unoccupied heating or cooling setpoints (threshold), the filtration system may operate using a lower efficiency (and/or lower pressure drop) filtering device unless conditions exist to use the higher efficiency filtering device. During occupied (by residents such as humans, animals, plants, etc.) times, the filtration system may operate using the higher efficiency (and/or higher pressure drop) filtering device when measured conditions (e.g., a contamination level) exceed a threshold for use of high efficiency filtration. During occupied times, the filtration system may operate using the lower efficiency (and/or lower pressure drop) filtering device when measured conditions (e.g., a contamination level) are below a threshold for use of higher efficiency filtration.

Other examples include pre-occupancy purge. Prior to occupancy, an optional pre-occupancy purge cycle can be initiated. While in the pre-occupancy purge, the filtration system may operate using the lower efficiency (and/or lower pressure drop) filtering device when measured conditions (e.g., a contamination level) are below the threshold for use of higher efficiency filtration. When measured conditions exceed the threshold for use of higher efficiency filtration, the higher efficiency (and/or high pressure drop) filtration device may be used. After occupancy, an optional post-occupancy purge cycle can be initiated. While in the post-occupancy purge, the filtration system may operate using the lower efficiency (and/or lower pressure drop) filtering device when measured conditions are below the threshold for use of higher efficiency filtration. When measured conditions exceed the threshold for use of higher efficiency filtration, the higher efficiency (and/or high pressure drop) filtration device may be used. When in morning warmup or morning cool down, the filtration system may follow the same control logic as pre-occupancy purge.

Figure 14:
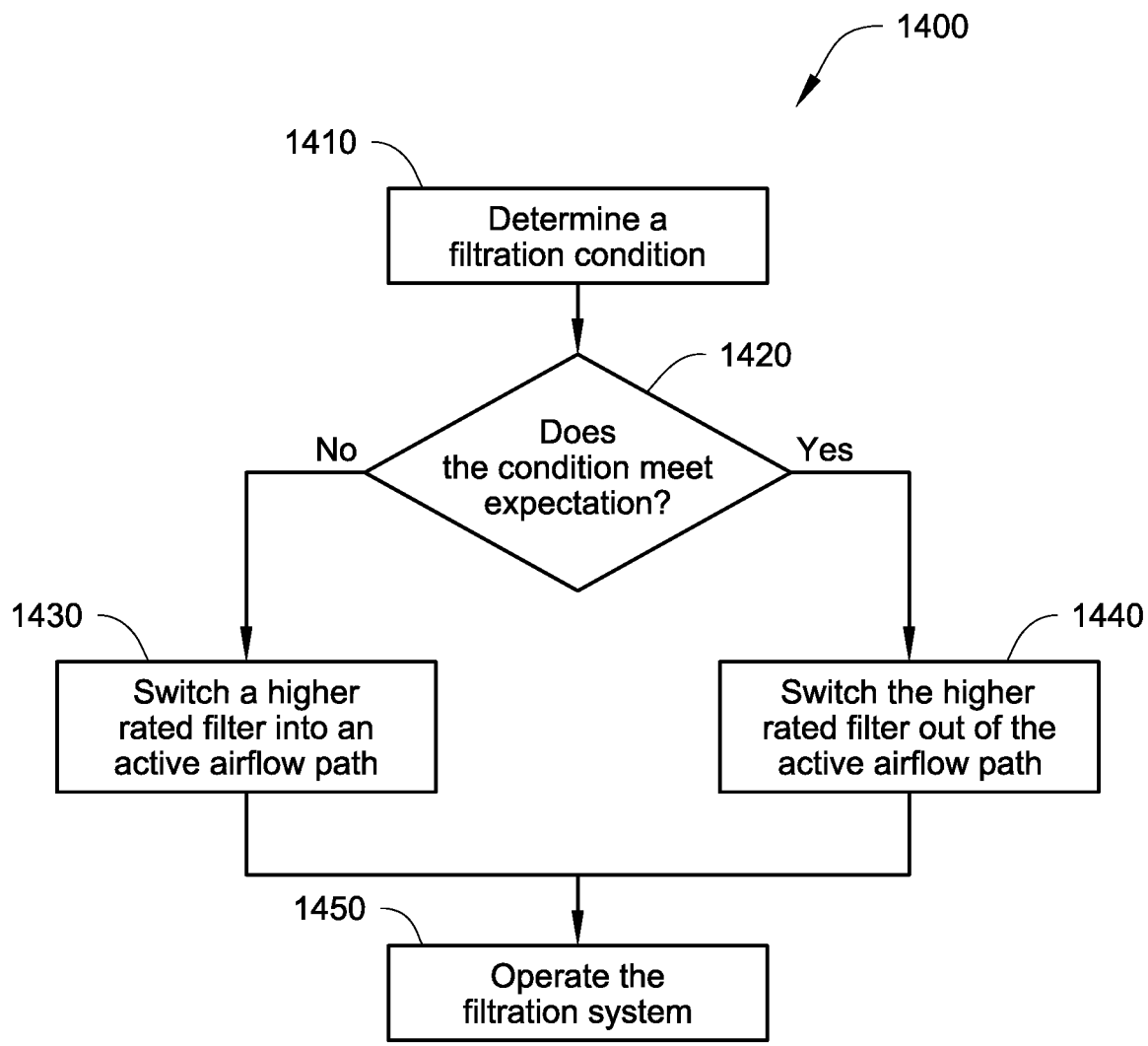
FIG. 14 illustrates a flowchart of a method for switching filters in a filtration system, according to an embodiment.

FIG. 14 illustrates a flowchart of a method 1400 for switching filters in a filtration system, according to an embodiment.

The flowchart 1400 may include one or more operations, actions, or functions depicted by one or more blocks 1410, 1420, 1430, 1440, and 1450. Although illustrated as discrete blocks, various blocks may be divided into additional blocks, combined into fewer blocks, or eliminated, depending on the desired implementation. In an embodiment, the method 1400 can be performed by the controller 145 of FIG. 2 or any other suitable controllers.

The flowchart 1400 may begin at block 1410. At 1410, the controller is configured to determine a filtration condition. In an embodiment, the filtration condition can be an air quality score. In another embodiment, the filtration condition can be space occupancy. In yet another embodiment, the filtration condition can be a measured condition during a scheduled pre-occupancy purge or post-occupancy purge for a space. In yet another embodiment, the filtration condition can be a measured condition during a scheduled warmup operation or cooldown operation for a space. Block 1410 may be followed by block 1420.

At 1420, the controller is configured to determine whether the filtration condition meets a predetermined expectation/condition/threshold. In an embodiment, the controller is configured to determine whether the air quality score or the measured condition exceeds (or at or below) a predetermined threshold. In another embodiment, the controller is configured to determine whether a space is occupied by residents. Block 1420 may be followed by block 1430 or block 1440.

At 1430, when the condition does not meet the predetermined expectation (e.g., the air quality score is at or below the predetermined threshold, or the measured condition indicates a need for a higher rated filter, or the space is occupied, etc.), the controller is configured to switch a higher rated filter into the active airflow path. Block 1430 may be followed by block 1450.

At 1440, when the condition meets the predetermined expectation (e.g., the air quality score exceeds the predetermined threshold, or the measured condition does not indicate a need for the higher rated filter, or the space is not occupied, etc.), the controller is configured to switch the higher rated filter out of the active airflow path. Block 1440 may be followed by block 1450.

At 1450, the controller is configured to operate the filtration system based on the filter configuration at 1430 or 1440.

It will be appreciated that in an embodiment, to avoid frequent switching the higher rated filter(s) into and out of the active airflow path, especially when e.g., the air quality score or the measured condition is close to the predetermined threshold, there can be a first threshold and a second threshold that is lower than the first threshold. In such embodiment, when the air quality score or the measured condition is at or below the second threshold, the controller is configured to switch a higher rated filter into the active airflow path. When the air quality score or the measured condition exceeds the first threshold, the controller is configured to switch the higher rated filter out of the active airflow path. When the air quality score or the measured condition is at or below the first threshold but exceeds the second threshold, the controller is configured to not switch filter(s) into or out of the active airflow path.

Embodiments disclosed herein can enable moving filtration material in and out of an airflow, or change of filter geometry (e.g., when a filter acts like a damper, with louvered panels that can close to create higher pressure drop and filter accordingly, or open to allow air to flow between the panels freely, thereby effectively taking the filter material out of use. A user interface, standalone or integrated into a building automation or other control system, can be provided to highlight filter selection, rationale for filter selection, enables filter resets, filter assignments, and/or control configuration to choose which filter is used, when, and why.

It will be appreciated that the filtration system can include standalone/in-room filters, return air filters, or filters for other locations in an airflow/environmental control system.

Embodiments disclosed herein provides a switchable filtration system that can manually or automatically divert air from one filter path to another, which includes a full or partial airflow selection, e.g., enabling partial flow through one filter with the remaining flow through one or more additional filters. Actuation can be achieved through dampers, gates, valves, or any other suitable means to control airflow velocity and pressure. Configurations of the filtration system include multipath (e.g., with separate damper control of airflow path across two or more filters), bypass (e.g., with one damper that opens to present a lower pressure drop filter, which causes airflow through that now-open bypass versus a higher pressure drop filter), or routing of return air or other airflows from one air handler with one type of filter or filters installed to another air handler with a different filter configuration. The filtration system may also be configured such that manual or automatic actuators move a filter in and out of an airflow, like a gate, a filter carousel, a rotating filter wheel (e.g., a desiccant wheel), or a rotating filter that moves a filter parallel to or perpendicular to an airflow. The filtration system may further be configured with a filter configured with louvered panels that can be opened or closed to activate or deactivate filter operation.

In some embodiments, it may be desirable to manage both comfort (e.g., thermal comfort including temperature, humidity, relative humidity, ventilation such as the level of carbon dioxide, or the like) and air quality in an occupied space. It may also be desirable to maintain comfort and air quality to acceptable levels while minimizing energy consumption. HVACR systems typically can control for example temperature and humidity according to comfort setpoints, and manage ventilation to control carbon dioxide ($CO_2$), provide free cooling (e.g., with outside air), and maintain sufficient fresh air. Standalone HEPA filtration units implemented in the occupied space, or ultraviolet light or photocatalytic oxidation implemented in an HVACR duct can be used to control air quality.

Typically, the comfort system and the air quality (or air cleaning) system may not be integrated to the extent required for simultaneous optimization of both occupant comfort and air quality relative to energy consumption. The systems may also not be accounted for directly by ACH_e or CADR considerations. For example, in-duct air cleaning methods may rely upon operation of the air handling systems and the systems' airflows for air cleaning efficacy; the airflow may be needed for air cleaning in one space served by the air handler, but may not be needed in another, thus reducing equipment and filter life while consuming more energy than required for a given condition. In another example, in-room air cleaning technologies may often be operated continuously, regardless of the air quality, comfort, and energy consumption state of the space at a given time, and such technologies may often be optimized for a certain type of pollutant while being less effective on others. For instance, HEPA air filters may be effective against fine particulates, but may rarely be effective against molecular, gaseous contaminants such as for example formaldehyde and others. Furthermore, contamination events in occupied spaces may be often transient in nature, and may often only require mitigation during such events instead of constant operation.

As such, in some applications, multi-variate optimization of comfort, air quality, and energy consumption may be difficult to achieve with only one air handling system which may be serving multiple spaces with different comfort and air quality situations. It may also be difficult to achieve with single-contaminant-reducing systems that are typically not connected to HVACR controls. Also, some air cleaning devices may not have standard CADR or ACH_e determination methods, and hence may be difficult to use in an energy optimization system despite the fact that such devices may be a desired air cleaning method for a given air quality condition.

Embodiments disclosed herein provide systems and methods that are effective against multiple common air and surface contaminants including volatile organic compounds (VOCs), fine particulate matter (PM), infectious pathogens, carbon dioxide ($CO_2$), or the like. Embodiments disclosed herein also provide a control system integrating an MCAC with an HVACR system. The control system can include one or more sensors measuring comfort parameters and one or more sensors measuring air quality parameters, as well as one or more sensors directly or indirectly measure or determine energy consumption for each operation for a given period of time. The control system can maintain comfort and air quality at or better than desired levels while minimizing energy consumption for the given period of time. The control system can also predictively control the comfort and air quality improvement methods in the space based on historical trends and/or machine learning.

FIGS. 15A-15D illustrates schematic diagrams (1500, 1501A, 1501B, and 1501C) of an HVACR system 1510 and a MCAC 1550, according to some embodiments.

The HVACR system 1510 includes an air handler (or air handling unit) 1515, an optional variable air volume (VAV) 1520, and ducts (or ductwork) 1502. Switching apparatus (e.g., dampers, valves, gates, or any other suitable air diverters) (1535, 1540, and 1545) can be placed in the ducts 1502 to control the airflow. It will be appreciated that the HVACR system 1510 can include e.g., the refrigerant circuit 100 of FIG. 1.

It will also be appreciated that the VAV 1520 can be referred to as a type of HVAC system, and that unlike constant air volume (CAV) systems, which supply a constant airflow at a variable temperature, VAV systems can vary the airflow at a constant temperature. It will further be appreciated that the advantages of VAV systems over constant-volume systems can include more precise temperature control, reduced compressor wear, lower energy consumption by system fans, less fan noise, and/or additional passive dehumidification.

The controller 1525 can be configured to control an operation of the HVACR system 1510 (e.g., to control a degree of opening (closed, partially opened, fully opened, or the like) of each of the dampers 1535, 1540, and 1545 to increase or decrease e.g., outside air ventilation) to control a comfort parameter/level (e.g., airflow, supply temperatures, humidity, relative humidity, and/or the carbon dioxide level) of the air/airflow in the ducts 1502 and/or in the occupied space 1504. In an embodiment, the comfort parameter/level may include a level of ventilation (e.g., to meet commercial ventilation requirements) based on occupancy.

The controller 1525 can also be configured to obtain the sensed/measured parameter(s) from the sensor(s) 1530. In an embodiment, the sensor 1530 can be a temperature sensor, a humidity sensor, and/or a carbon dioxide sensor, or the like.

The MCAC 1550 may include application-specific combinations of air cleaning mechanisms. For example, a typical HVACR system may not be optimized for a rapid mitigation of a transient VOC and/or PM event in a specific space served by an air handler, but an MCAC can be designed and controlled to mitigate such events in an energy efficient way without significantly impacting temperature, relative humidity, or other parameters that may be part of an HVACR control system. An MCAC may include HEPA filtration, Dry Hydrogen Peroxide (DHP) generation, photocatalytic oxidation (PCO) capability, and/or gas and/or $CO_2$ scrubber with airflow separate from or in parallel to an HVACR air handler, configured for e.g., rapid in-space pathogen mitigation capability for air and surfaces.

The MCAC 1550 can include a first filter (e.g., a pre-filter) 1555. It will be appreciated that the filter 1555 can be a porous device configured to remove impurities or solid particles from air flow passed through the device. The MCAC 1550 can also include an HEPA filter 1560. In an embodiment, the HEPA filter 1560 can be mounted to the ceiling of the occupied space. The HEPA filter 1560 can be disposed downstream of the filter 1555 with respect to the direction of airflow, or in parallel to the filter 1555 (see e.g., FIGS. 4-13) with respect to the direction of airflow so that each of them can be switched into or out of the active airflow path. The MCAC 1550 can further include a fan 1565 configured to increase or decrease airflow or airflow rate through e.g., the HEPA filter 1560. It will be appreciated that there can be a large amount of electricity/energy used by the fan 1565 due to the pressure drop across the HEPA filter 1560, and the amount of airflow on the HEPA unit (1560 and 1565) can vary based on how well the ventilation from outside air in the filtration from the air handler of the HVACR system is mitigating/improving the air quality in the space. The operation (e.g., the on/off or speed of the fan 1565) of the HEPA unit can be optimized (e.g., increased, decreased, turned on or off, or the like) based on the sensed data, to supplement, when needed, what is coming from the outside air in the air handler.

The MCAC 1550 can also include a scrubber 1570 (e.g., a gas scrubber, a $CO_2$ scrubber, or the like) configured to remove/reduce e.g., Carbon Dioxide ($CO_2$), Volatile Organic Compounds (VOCs), Particulate Matter (PM), $NO_2$, $SO_2$, Ozone ($O_3$), Carbon Monoxide (CO), Formaldehyde ($CH_2O$), or the like. It will be appreciated that a scrubber can be referred to as an air pollution control device or a diverse group of air pollution control devices that can be used to remove some particulates and/or gases from the air/airflow. The sensor 1530 can be configured to sense/measure a level of each of the gas ($CO_2$, VOCs, $NO_2$, $SO_2$, $O_3$, CO, $CH_2O$) and/or PM and/or VOCs. The scrubber 1570 can be disposed downstream of the filter 1555 and/or the HEPA filter 1560 with respect to the direction of airflow, or in parallel to the filter 1555 and/or the HEPA filter 1560 (see e.g., FIGS. 4-13) with respect to the direction of airflow so that each of them can be switched into or out of the active airflow path.

It will be appreciated that in addition to and/or independent to the filters (1555, 1560) and/or the scrubber 1570, the MCAC 1550 can include gaseous filter(s) that can be configured to control VOCs, including activated carbon and/or other types of adsorption filter(s) that can be used against VOCs and/or other gases, not just particulate matter.

The MCAC 1550 can further include a Dry Hydrogen Peroxide (DHP) generator 1575. It will be appreciated that DHP can be referred to as a non-aqueous and non-aerosolized gas used for environmental disinfection (e.g., reduction of virus, bacteria, mold, pathogens, or the like in the air/airflow). The sensor 1530 can be configured to sense/measure a level of each of the virus, bacteria, mold, pathogens, or the like. The DHP generator 1575 can be disposed downstream of the filter 1555 and/or the HEPA filter 1560 and/or the scrubber 1570 with respect to airflow, or in parallel to the filter 1555 and/or the HEPA filter 1560 and/or the scrubber 1570 (see e.g., FIGS. 4-13) with respect to the direction of airflow so that each of them can be switched into or out of the active airflow path. In an embodiment, the DHP generator 1575 is disposed downstream from any other components of the MCAC 1550.

It will be appreciated that the sensor(s) 1530 can include at least one HVACR sensor and/or at least one MCAC sensor or the like. The sensor(s) 1530 can be a temperature sensor, a humidity sensor, a carbon dioxide sensor, or a combination of various sensors. The sensor(s) 1530 can be configured to sense/measure a level of each of the gas ($CO_2$, VOCs, $NO_2$, $SO_2$, $O_3$, CO, $CH_2O$) and/or PM and/or VOCs, a level of each of the virus, bacteria, mold, pathogens, or a combination thereof, or the like. The sensor(s) 1530 can be disposed at any suitable locations, inside or outside the occupied space 1504.

It will be appreciated that DHP typically requires airflow and the DHP generator 1575 needs to run continuously. As such, a relatively low-airflow (and thus low energy consumption) and continuously running fan 1585 may be needed instead a relatively high-airflow (and thus high energy consumption) fan (e.g., the fan 1565) being running continuously, when only the DHP generator 1575 is needed (or switched into the active airflow path). That is, a low-airflow fan 1585 can be deployed for continuously operating the DHP generator 1575 without pulling large volumes of air through the fan 1565 or the like, thereby reducing energy consumption when only the DHP generator 1575 is being operated. The low-airflow fan 1585 can be integrated on a bypass circuit (including e.g., a switching apparatus 1580 such as a valve or the like) that can be closed and/or turned off with electronic or vacuum pressure when a larger airflow (e.g., airflow for the HEPA filter 1560) is required. The low-airflow fan 1585 integrated on the bypass circuit (including the valve 1580) can be opened and/or turned on when only the DHP generator 1575 of the MCAC 1550 is being operated.

It will also be appreciated that as described above, the MCAC 1550 can be configured in the following manner (in order of contact for an airflow path): pre-filter, HEPA filter, air circulation fan/blower, gas and/or $CO_2$ scrubber, a photocatalytic oxidation (PCO) device, and/or DHP generator. In an embodiment, the PCO device can include photocatalytic oxidation material and an ultraviolet (UV) light source (to e.g., emit UV light to power the catalytic reaction of the photocatalytic oxidation material). The photocatalytic oxidation material can be disposed on any suitable surface(s) of the MCAC, any suitable surface(s) of the HVACR system, or any other suitable surface(s), including on the components of the MCAC 1550 described above or as a separate component. In an embodiment, it is desired to place the DHP generation last in the airflow path to optimize DHP concentration as well as facilitate long life of a DHP-generating catalyst. The MCAC 1550 can be configured with serial air cleaning mechanisms contained in a single device, or as a distributed system in which multiple air cleaning mechanisms may be deployed in the space but not packaged together. The MCAC 1550 may utilize selective filtration (see FIGS. 4-13) to present and/or remove different types of filtration mechanisms from the airflow. It will further be appreciated that the MCAC 1550 can include one or more of the components described herein.

The controller 1525 can be configured to control an operation of the MCAC 1550, for example, turning on/off the fan 1565 and/or the fan 1585 and/or other components; increasing or decreasing the speed of the fan 1565 and/or the fan 1585; closing or opening the valve 1580; switching one or more the MCAC components into or out of the active airflow path (see descriptions for FIGS. 4-13); or the like, to increase or decrease the air quality score (see discussions on air quality score in previous sections, also referred to as the "IAQ" score). For example, the controller 1525 can be configured to turn off an integrated $CO_2$ scrubber but keeping the DHP generator on when $CO_2$ is low but pathogen transmission risk is high. The IAQ score can be determined based on a level of one or more of $CO_2$, VOCs, PM, $NO_2$, $SO_2$, $O_3$, CO, $CH_2O$, pathogens, virus, bacteria, mold, or the like. The fans can be variable speed fans or constant speed fans.

Figure 15A:
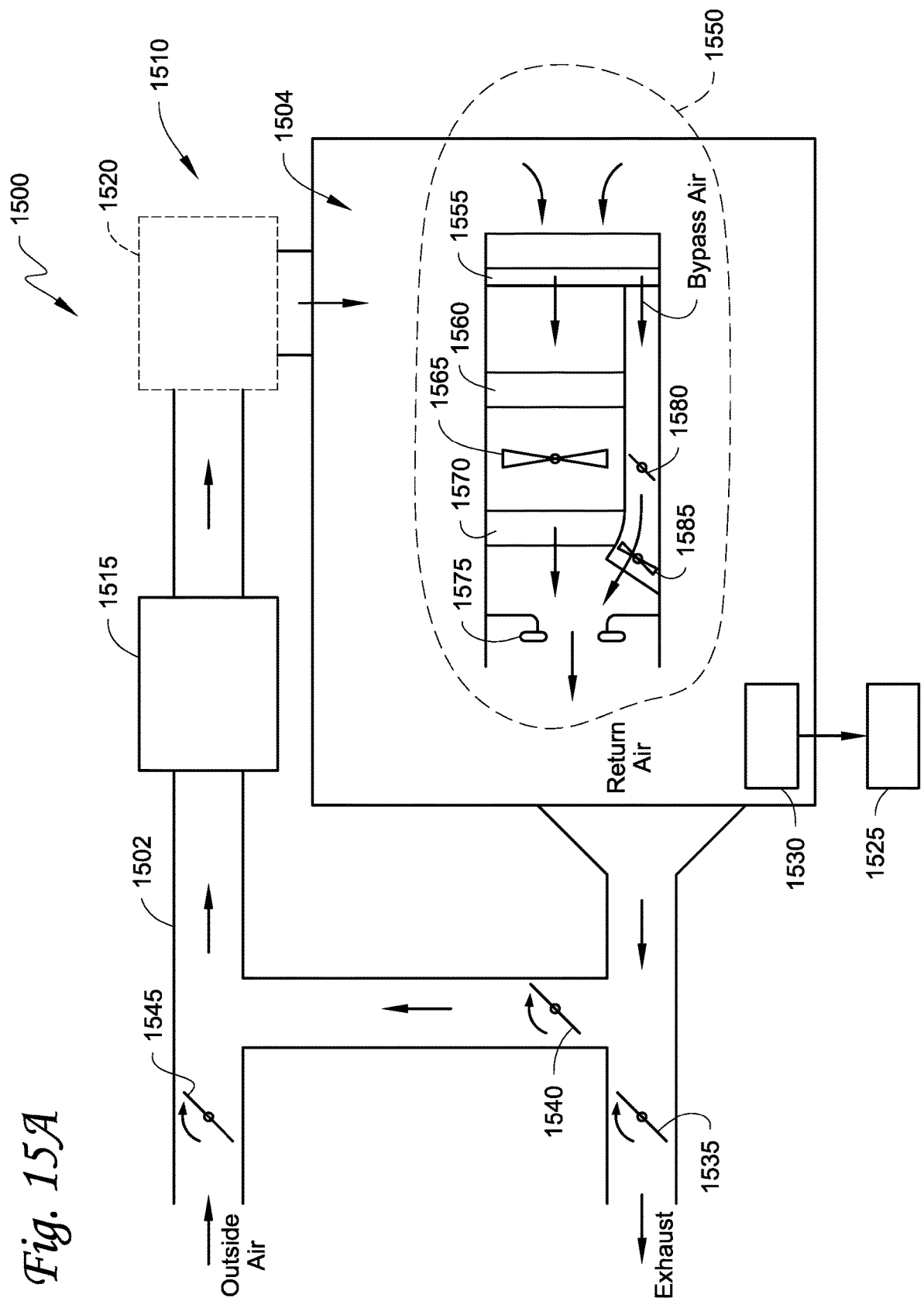
FIGS. 15A-15D illustrates schematic diagrams of an HVACR system and an MCAC, according to some embodiments.

As shown in FIG. 15A, the HVACR system 1510 is mainly disposed outside of the occupied space 1504, with outside air passing through the damper 1545, the air handler 1515, and the optional VAV 1520; and entering the occupied space 1504 through ducts 1502. The air from the occupied space 1504 exhausts into the ducts 1502, and recirculates and mixes with the outside air via the damper 1540 and/or exhausts to the outside via the damper 1535. The MCAC 1550 is mainly disposed inside the occupied space 1504, with air from the ducts 1502 entering the MCAC 1550 (e.g., through the filter 1555, the HEPA filter 1565, the scrubber 1570, and/or the DHP generator 1575; or through the filter 1555 and then via the bypass circuit through the valve 1580 and the DHP generator 1575) and exiting from the MCAC 1550 (e.g., through the DHP generator 1575).

It will be appreciated that the HVACR system 1510 is typically configured to control temperature and humidity (e.g., relative humidity) according to comfort setpoints (e.g., temperature setpoint, humidity setpoint, relative humidity setpoint, or the like). The HVACR system 1510 can also be configured to manage ventilation to control carbon dioxide, provide free cooling (e.g., using outside air (with e.g., an economizer) to provide cooling), and maintain sufficient fresh air. The MCAC 1550 is configured to control the air quality (e.g., IAQ score), and is controlled (e.g., by a single controller 1525) as part of the HVACR system 1510 but not necessarily fully contained in the airflow of the HVACR system 1510 (because if the MCAC is fully contained in ducts of the HVACR system, airflow and constant operation of such may be required, which may impact the comfort setpoint). That is, the MCAC 1550 is independent to (or separated from) the HVACR system 1510, but the controller 1525 holistically controls the MCAC 1550 and the HVACR system 1510. It will also be appreciated that the components of the MCAC 1550 can be packaged together or deployed in any separate suitable locations.

Figure 15B:
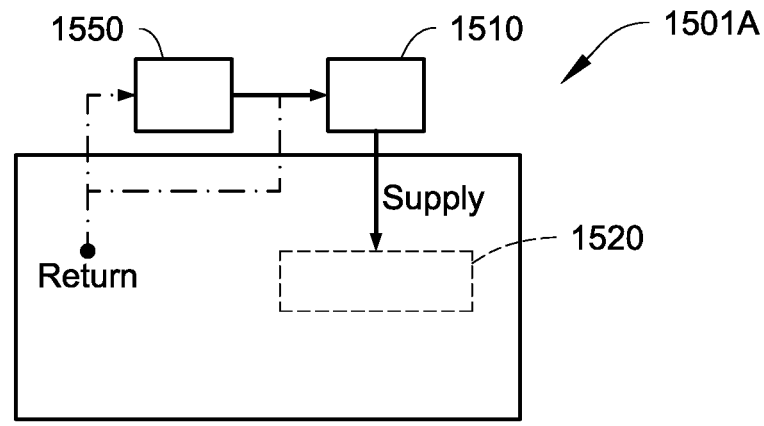
Figure 15C:
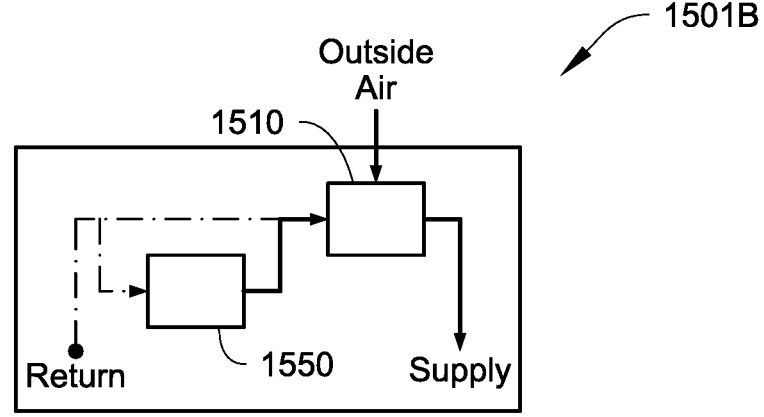
Figure 15D:
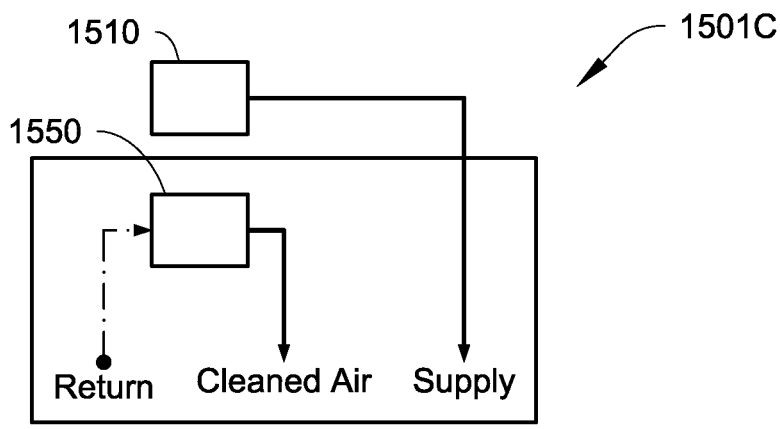

It will further be appreciated that the HVACR system 1510 and the MCAC 1550 can be disposed in any suitable locations. For example, the MCAC 1550 can be ducted in the air handler or roof top unit of the HVACR system 1510, or located in the occupied space, or fully decoupled from the HVACR system 1510. FIGS. 15B-15D show various configurations of the locations 1501A, 1501B, 1501C of the HVACR system 1510 and the MCAC 1550. FIG. 15B shows that the MCAC 1550 and the HVACR system 1510 are disposed outside the occupied space, while the optional VAV 1520 is disposed inside the occupied space. FIG. 15C shows that the MCAC 1550 and the HVACR system 1510 are disposed inside the occupied space. FIG. 15D shows that the HVACR system 1510 is disposed outside the occupied space, while the MCAC 1550 is disposed inside the occupied space.

Figure 16:
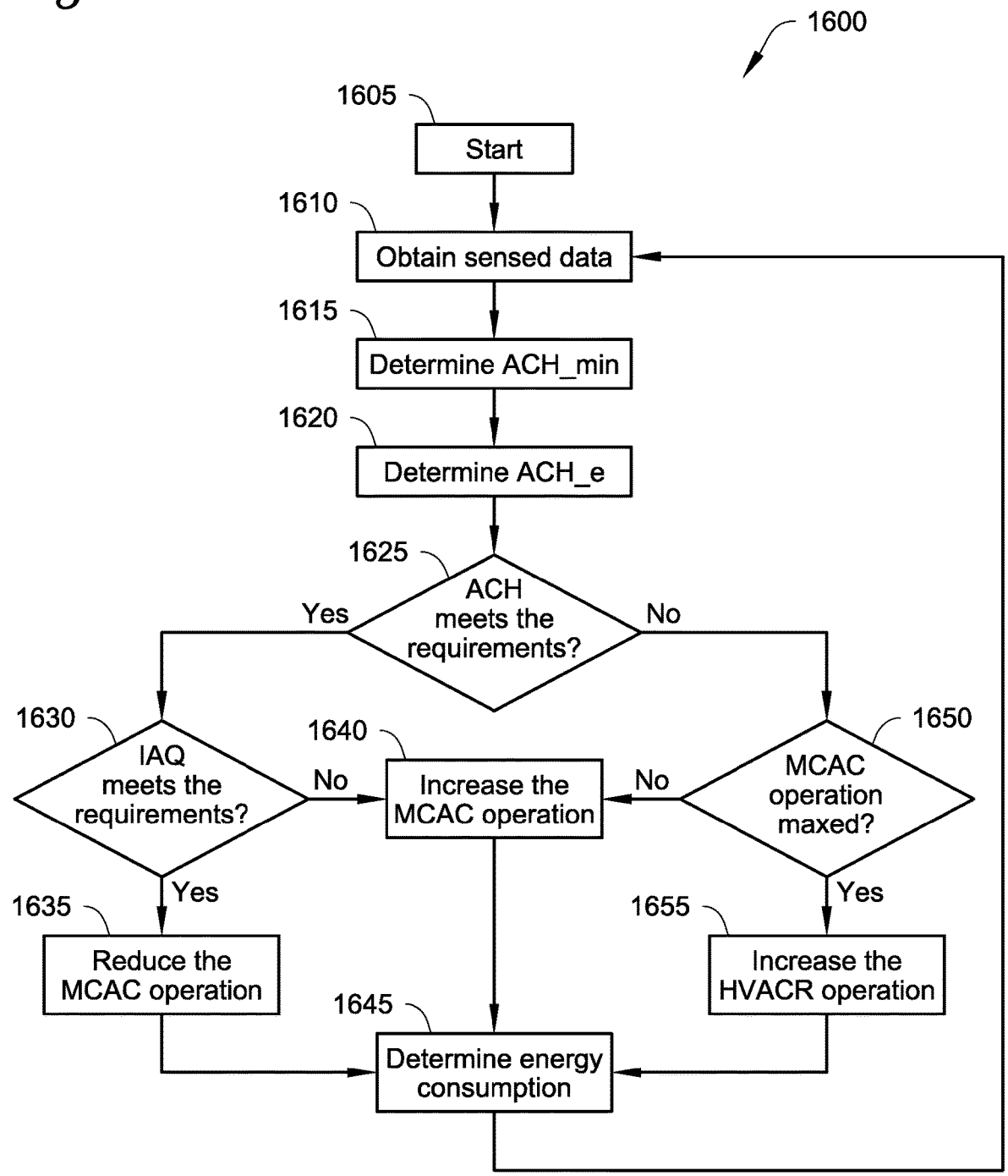
FIG. 16 illustrates a flowchart of a method for holistically controlling the HVACR system and the MCAC, according to an embodiment.

FIG. 16 illustrates a flowchart of a method 1600 for holistically controlling the HVACR system 1510 and the MCAC 1550, according to an embodiment.

The flowchart 1600 may include one or more operations, actions, or functions depicted by one or more blocks 1605, 1610, 1615, 1620, 1625, 1630, 1635, 1640, 1645, 1650, and 1655. Although illustrated as discrete blocks, various blocks may be divided into additional blocks, combined into fewer blocks, or eliminated, depending on the desired implementation. In an embodiment, the method 1600 can be performed by the controller 145 of FIG. 2, the controller 1525 of FIG. 15A, or any other suitable controller(s).

The method 1600 may begin at block 1605. Block 1605 may be followed by block 1610. At 1610, the controller is configured to obtain the sensed/measured parameters/data from the sensor(s) (e.g., sensor 1530 of FIG. 15A). The sensor can be configured to sense/measure the air quality parameters and/or the comfort parameters such as a level of each of the gas ($CO_2$, VOCs, $NO_2$, $SO_2$, $O_3$, CO, $CH_2O$, or the like); a level of PM; a level of VOCs or total VOCs; a humidity; a temperature; a relative humidity; a level of ventilation; a level of each of the virus, bacteria, mold, pathogens; an airflow rate; an air volume; or the like. For example, the sensor can include a semiconductor metal oxide gas sensor, a temperature sensor, a pressure sensor, or the like. Block 1610 may be followed by block 1615.

At 1615, the controller is configured to determine a minimum air changes (ACH_min, minimum required air changes per hour) of the HVACR system. In an embodiment, the ACH_min can be determined based on e.g., the minimum required airflow rate (in the unit of cubic feet per minute) of ventilation air from the outdoor air ventilation system, airflow rate through the filter in the central unit (e.g., air handler), volume of the occupied space or volume of the air being treated for the space, the effectiveness of the filtration (e.g., the minimum efficiency reporting value (MERV) rating value) in the central unit, and/or the current control configuration (e.g., fan speed, damper position, or the like) of the HVACR system, to achieve e.g., comfort setpoints. Block 1615 may be followed by block 1620.

At 1620, the controller is configured to determine an equivalent air changes (ACH_e, equivalent air changes per hour, ventilation equivalency, or equivalent outside air ratings) of the MCAC. In an embodiment, the ACH_e can be determined based on a clean air delivery rate (CADR, in the unit of cubic meter per hour) and/or airflow rate through the filter(s) of the MCAC 1550. See e.g., https://www.ashrae-.org/technical-resources/building-readiness. The CADR of the MCAC 1550 can be determined by, e.g., an effectiveness or rating of the filters (1555 and/or 1560) in the airflow. It will be appreciated that the ACH_e and/or the CADR can be determined for each controllable state of the MCAC 1550. It will also be appreciated that the ACH_e of the MCAC 1550 and/or the ACH_e of the system can be determined based on the American Society of Heating, Refrigerating and Air-Conditioning Engineers (ASHRAE) guidelines. Block 1620 may be followed by block 1625.

At 1625, the controller is configured to determine whether a combination of the ACH_min and the ACH_e (ACH) meets the requirements (e.g., within a desired range, equal to or above a predetermined threshold, or the like). If the ACH meets the requirements, block 1625 may be followed by block 1630. If the ACH does not meet the requirements, block 1625 may be followed by block 1650.

At 1630, the controller is configured to determine whether the air quality (or IAQ) score meets the requirement (e.g., within a desired range, equal to or above a predetermined threshold, or the like). The IAQ score can be determined based on a level (sensed, measured, or determined) of one or more of $CO_2$, VOCs, PM, $NO_2$, $SO_2$, $O_3$, CO, $CH_2O$, pathogens, virus, bacteria, mold, or the like, compared with a respective desired level. In an embodiment, the IAQ score can be determined based on a setpoint for one or more of a level of $CO_2$, VOCs, PM, $NO_2$, $SO_2$, $O_3$, CO, $CH_2O$, pathogens, virus, bacteria, and mold. If the IAQ score meets the requirements (e.g., within a desired range, equal to or above a predetermined threshold, or the like), block 1630 may be followed by block 1635. If the IAQ score does not meet the requirements, block 1630 may be followed by block 1640.

At 1635, the controller is configured to reduce the operation of the MCAC 1550 for air cleaning (and thus reducing the IAQ score and reducing energy consumption). It will be appreciated that reducing the operation of the MCAC 1550 can include switching one or more of the filter 1555, the HEPA filter 1560, the fan 1565, the scrubber 1570, and the DHP generator 1575 out of the active airflow path of the MCAC 1550; switching the fan 1585 (and the valve 1580) into the active airflow path if only the DHP generator 1575 is used for air cleaning; turning off the fan 1565 and/or the fan 1585; reducing a speed of the fan 1565 and/or the fan 1585; or the like. Reducing the operation of the MCAC 1550 may lead to reducing the ACH_e and/or reducing the IAQ score. Block 1635 may be followed by block 1645.

At 1640, the controller is configured to increase the operation of the MCAC 1550 for air cleaning (and thus increasing the IAQ score and increasing energy consumption). It will be appreciated that increasing the operation of the MCAC 1550 can include switching one or more of the filter 1555, the HEPA filter 1560, the fan 1565, the scrubber 1570, and the DHP generator 1575 into the active airflow path of the MCAC 1550 if they are not in the active airflow path; switching the fan 1585 (and the valve 1580) out of the active airflow path (e.g., closing the bypass circuit with electronic or vacuum pressure); turning on the fan 1565 and/or the fan 1585 if they have not been turned on yet; and/or increasing a speed of the fan 1565 and/or the fan 1585 if the speed is not maximized yet; or the like. Increasing the operation of the MCAC 1550 may lead to increasing the ACH_e and/or increasing the IAQ score. Block 1640 may be followed by block 1645.

At 1650, the controller is configured to determine whether the operation of the MCAC 1550 for air cleaning is at a maximum level. It will be appreciated that the operation of the MCAC 1550 being at the maximum level can be referred to as e.g., all the components (with or without the exception of the bypass valve 1580 and/or the low-airflow fan 1585) of the MCAC 1550 being switched into the active airflow path, and/or all the fans (with or without the exception of the low-airflow fan 1585) being running at their maximum speed and/or capacity, or the like. If the operation of the MCAC 1550 is not at the maximum level, block 1650 may be followed by block 1640. If the operation of the MCAC 1550 is at the maximum level, block 1650 may be followed by block 1655.

At 1655, the controller is configured to increase the operation of the HVACR system 1510 for outside air ventilation for a better/increased comfort level. It will be appreciated that increasing the operation of the HVACR system 1510 can include increasing a degree of opening of the damper 1545 (and/or dampers 1535 and/or 1540), and/or increasing a fan speed of the air handler 1515, or the like. Increasing the operation of the HVACR system 1510 may lead to increasing the ACH_min and/or the energy consumption. Block 1655 may be followed by block 1645.

At 1645, the controller is configured to determine or estimate the energy consumption of the HVACR system 1510 and/or the energy consumption of the MCAC 1550 along with or without a previous control configuration (e.g., from 1635, 1640, or 1655). It will be appreciated that energy consumption can be determined based on e.g., voltage and/or current sensed/measured on the electronic bus in the HVACR system 1510 and/or the MCAC 1550 over a period of time, the configurations of the fan(s) (e.g., fan speed, or the like) and/or other electronic components measured or determined over a period of time, or the like. The determined or estimated energy consumption can be recorded, stored, and/or used for display, visualization, or for predicting and deploying next control configuration/logic (e.g., at 1635, 1640, or 1655) based on historical or time-based trending energy consumption data. It will be appreciated that the energy consumption can be determined or estimated for each control point (e.g., the "increase"/"reduce" control point(s) at 1635, 1640, or 1655) of the HVACR system 1510 and/or the MCAC 1550.

It will be appreciated that the MCAC 1550 can be configured to handle one or more contaminants, and the operation of the MCAC 1550 and/or the HVACR system 1510 can be optimized based on real-time or near real-time sensor data. Increasing and/or decreasing an operation of the MCAC 1550 and/or an operation of the HVACR system 1510 may depend on the real-time or near real-time sensor data. For example, if sensor(s) indicating no issue with PM2.5 but VOCs being over a threshold, increasing the operation of the MCAC 1550 can include switching an activated carbon filter into the active airflow path, switching the HEPA filter out of the active airflow path, and/or keeping the DHP generator on, etc. If the MCAC 1550 includes a photocatalytic oxidation technology, then increasing the operation of the MCAC 1550 can include switching the photocatalytic oxidation device on instead of using an activated carbon filter. In another example, if sensor(s) indicating no issue with the VOCs but high PM2.5, increasing the operation of the MCAC 1550 can include switching the HEPA filter into the active airflow path and/or keeping the DHP generator on or the like. If sensor(s) indicating e.g., high $CO_2$ signaling possible higher occupancy, increasing the operation of the MCAC 1550 can include increasing the fan speed of the MCAC 1550 or the like. If sensor(s) indicating lower than normal $CO_2$, reducing the operation of the MCAC 1550 can include decreasing the fan speed of the MCAC 1550 (thus optimizing energy use) or the like until e.g., the ACH_e drops to a point that more outdoor air ventilation is required.

In an embodiment, the sensed, measured, or determined data/parameters can be recorded, stored, and/or used for predicting and deploying next control point (e.g., the "increase"/"reduce" control point(s) at 1635, 1640, or 1655) based on historical or time-based trending data/parameters. For example, typically when a level of $CO_2$ increases, occupancy in the space is increasing, and there may be more VOCs, pathogens, or the like in the air. The controller can be configured to increase the operation of the MCAC (air cleaning) based on the increasing $CO_2$ before the real VOCs data are sensed/measured via the sensors. In another example, based on time-based trending data, which may indicate that around a particular time (e.g., at around 7:40 AM), a level of VOCs typically increases significantly; as such, at a specific interval before the particular time (e.g., at around 7:20 AM), the controller can be configured to start or increase the operation of the MCAC for air cleaning (e.g., by turning on the HEPA fan, switching the HEPA fan into the active airflow path, and/or increasing the speed of the HEPA fan, or the like) to reduce the level of the VOCs before the VOCs get beyond the desired threshold.

In an embodiment, the predicting and deploying next control configuration/logic can also be based on a usage or type of the building or occupied space. For example, in one type of building (e.g., a movie theater or the like), the level of $CO_2$ may decrease a period of time after people entering the building (e.g., when a movie is playing and people are quiet); while in another type of building (e.g., an exercise facility or the like), the level of $CO_2$ may increase a period of time after people entering the building (e.g., when people are starting exercising) where the activity level may increase.

In an embodiment, the sensed, measured, or determined data/parameters can be recorded, stored, and/or used for predicting and deploying next control configuration/logic using artificial intelligence or machine learning. A machine learning model can be generated, trained using the stored data/parameters, and deployed for prediction or control configuration. It will be appreciated that the steps in such embodiment can be implemented in and/or performed by a controller (e.g., the controller 145 of FIG. 2).

It will be appreciated that the controller can be configured to analyze historical trends in the HVACR system sensor data and/or the MCAC/IAQ sensor data. Such trends can be utilized to predict the ventilation requirements (e.g., of the HVACR system) and/or the air quality requirements (e.g., of the MCAC) for the current operation and/or future operations. In an embodiment, the controller can use a pre-configured dynamic model or empirically build a dynamic model of the holistic system including the HVACR system and the MCAC. The controller can use the model to optimize for the current operation while considering the impact to future operations as predicted by the model.

For example, in an embodiment, based on the historical data, the controller can determine the average time period of a day that the MCAC operation is increased (e.g., requiring a higher fan speed, switching in an HEPA filter, or the like) based on e.g., when people start occupying the space. The controller can take such time period into account and start to ramp up the MCAC operation before such time period (i.e., before the air quality decreases), minimizing the chance that a higher HVACR ventilation (and hence higher energy use) may be needed in the near future (i.e., during such time period). The controller can also monitor the response (e.g., by monitoring the sensor data) and react accordingly based on the response.

In an embodiment, the model (used by the controller), through historical data, may demonstrate that one comfort parameter may be inversely correlated to a combination of one HVACR sensor parameter and one air quality sensor parameter. Such model can enable the controller to predict the comfort parameter based on the trends observed in the HVACR and air quality sensor data, and optimize (e.g., decrease or increase) operation of the system accordingly.

In an embodiment, the model (used by the controller) may include energy consumption and time of use/peak demand charge predictions based on historical data and current electrical utility rates. The model may also include energy determinations for each possible state of the MCAC and the HVACR system. The model may further include operating cost determinations for each state of the system (the HVACR system and/or the MCAC). Such model can enable the controller to determine predicted energy costs for a given new system state, and optimize for energy consumption accordingly. For example, the system may be configured to achieve comfort and air quality parameters equally with multiple methods available for a given set of sensor data. Enabling energy cost predictions can help optimize which method may be used at a given time. In some cases, it may be preferred to utilize more fresh outside air ventilation then increasing the MCAC operation to solve an air quality issue, because the energy costs may be lower than the cost of operating an air cleaning device with consumables. In other cases, the cost of operating air cleaning devices may be far lower than the cost of introducing more fresh air, thus pushing the controller to prioritize air cleaning over ventilation within the requirements of the system.

Block 1645 may be followed by block 1610 to repeat on each control cycle. It will be appreciated that between block 1645 and block 1610, there can be a predetermined wait time (e.g., to get to a steady state) before the flow chart goes to next control cycle. It will be appreciated that a control cycle can be referred to as the steps from block 1610 to block 1645. When the block 1645 loops back to block 1610, a new/next control cycle starts/begins.

Embodiments disclosed herein can compare continuous or near-continuous sensor readings to static and/or dynamic thresholds and/or setpoints for comfort and air quality (e.g., to determine if improvement is necessary to maintain comfort, air quality, or both). Embodiments disclosed herein can also provide control to determine the optimum action to take for a given air quality/comfort condition that minimizes energy consumption within operating parameters. Such action may include total or partial operation of the MCAC. For example, the control system can be configured as a typical energy efficient HVACR control system that provides minimum acceptable ventilation based on the ASHRAE guidelines or the like, and controls comfort to within desired setpoints. In-room sensor(s) can be controlled to a setpoint, based on e.g., building type, building use, customer desire, or the like. The control or optimization can be based on which contaminate is of concern or to remove. When sensors sense or measure (and the controller determines) that the air quality within a space requires mitigation to stay in an acceptable range, the control system can decide if more ventilation, activation of one or more components of the MCAC, or both may be the desired solution to control comfort and air quality while minimizing energy consumption.

Embodiments disclosed herein can further provide ability to predict comfort and/or air quality issues based on historical trends or machine learning, and can apply controls to start mitigation before the problem occurs, thereby enabling less energy utilization.

Embodiments disclosed herein can reduce outside air ventilation (and thus energy) based on the ACH requirements, or increase the outside air ventilation for better comfort, to control air cleaning devices for the minimum energy required. Embodiments disclosed herein can optimize energy consumption, the levels of air quality parameters measured by the sensors, and/or the timing to improve air quality.

ASPECTS

It is appreciated that any one of aspects 1-20, 21, 22, 23, 24, and 25-44 can be combined with each other.

Aspect 1. A switchable filtration system for a heating, ventilation, air conditioning, and refrigeration (HVACR) system, the filtration system comprising:
a first filter;
a second filter;
a switching apparatus; and
a controller,
wherein the controller is configured to determine an air quality score, wherein when the air quality score exceeds a predetermined threshold, the controller controls the switching apparatus to switch the first filter out of an active airflow path.

Aspect 2. The filtration system according to aspect 1, wherein the first filter has one or more of a higher pressure drop, a higher efficiency, and a higher rating than the second filter; the first filter is a particulate filter for filtering particulate matter or a gaseous filter for filtering volatile organic compounds.

Aspect 3. The filtration system according to aspect 1 or aspect 2, wherein the switching apparatus includes a first damper disposed upstream of the first filter, and a second damper disposed upstream of the second filter, wherein when the air quality score exceeds the predetermined threshold, the controller controls the first damper to block airflow to the first filter.

Aspect 4. The filtration system according to aspect 3, wherein when the air quality score exceeds the predetermined threshold, the controller controls the second damper to allow airflow to the second filter.

Aspect 5. The filtration system according to aspect 3 or aspect 4, wherein when the air quality score is at or below the predetermined threshold, the controller controls the first damper to allow airflow to the first filter.

Aspect 6. The filtration system according to any one of aspects 3-5, wherein when the air quality score is at or below the predetermined threshold, the controller controls the second damper to block airflow to the second filter.

Aspect 7. The filtration system according to any one of aspects 3-6, wherein the first filter is disposed in a first air handler, and the second filter is disposed in a second air handler.

Aspect 8. The filtration system according to any one of aspects 1-7, wherein the switching apparatus includes a damper disposed upstream of the first filter and the second filter, wherein when the air quality score exceeds the predetermined threshold, the controller controls the damper to block airflow to the first filter.

Aspect 9. The filtration system according to aspect 8, wherein when the air quality score is at or below the predetermined threshold, the controller controls the damper to allow airflow to the first filter.

Aspect 10. The filtration system according to any one of aspects 1-9, wherein the first filter includes a main surface having a filtration material, the first filter further includes a rotational axis, a first direction and a second direction being substantially parallel with the main surface, the first direction is substantially perpendicular to the second direction, wherein when the air quality score exceeds the predetermined threshold, the controller controls the switching apparatus to rotate the first filter so that the main surface is substantially in parallel with a direction of an airflow.

Aspect 11. The filtration system according to aspect 10, wherein when the air quality score exceeds the predetermined threshold, the controller controls the switching apparatus to rotate the first filter about the first direction.

Aspect 12. The filtration system according to aspect 10, wherein when the air quality score exceeds the predetermined threshold, the controller controls the switching apparatus to rotate the first filter about the second direction.

Aspect 13. The filtration system according to aspect 12, wherein the filtration system includes a plurality of first filters, wherein when the air quality score exceeds the predetermined threshold, the controller controls the switching apparatus to rotate the plurality of first filters about the second direction.

Aspect 14. The filtration system according to any one of aspects 10-13, wherein when the air quality score is at or below the predetermined threshold, the controller controls the switching apparatus to rotate the first filter so that the main surface is substantially perpendicular to the direction of the airflow.

Aspect 15. The filtration system according to aspect 14, wherein when the air quality score is at or below the predetermined threshold, the controller controls the switching apparatus to rotate the first filter about the first direction.

Aspect 16. The filtration system according to aspect 14, wherein when the air quality score is at or below the predetermined threshold, the controller controls the switching apparatus to rotate the first filter about the second direction.

Aspect 17. The filtration system according to any one of aspects 1-16, wherein the first filter includes a main surface having a filtration material, the main surface is substantially perpendicular to the active airflow path, wherein when the air quality score exceeds the predetermined threshold, the controller controls the switching apparatus to move the first filter out of the active airflow path in a direction substantially perpendicular to the active airflow path.

Aspect 18. The filtration system according to aspect 17, wherein when the air quality score is at or below the predetermined threshold, the controller controls the switching apparatus to move the first filter into the active airflow path in the direction substantially perpendicular to the active airflow path.

Aspect 19. The filtration system according to any one of aspects 1-18, wherein when the air quality score exceeds the predetermined threshold, the controller controls the switching apparatus to rotate the first filter out of the active airflow path and rotate the second filter into the active airflow path.

Aspect 20. The filtration system according to any one of aspects 1-19, wherein when the air quality score is at or below the predetermined threshold, the controller controls the switching apparatus to rotate the first filter into the active airflow path and rotate the second filter out of the active airflow path.

Aspect 21. A method for switching filters in a filtration system for a heating, ventilation, air conditioning, and refrigeration (HVACR) system, the filtration system including a first filter, a second filter, a switching apparatus, and a controller,
the method comprising:
determining, by the controller, an air quality score; and
when the air quality score exceeds a predetermined threshold, controlling the switching apparatus to switch the first filter out of an active airflow path,
wherein the first filter has one or more of a higher pressure drop, a higher efficiency, and a higher rating than the second filter.

Aspect 22. A switchable filtration system for a heating, ventilation, air conditioning, and refrigeration (HVACR) system, the filtration system comprising:
a first filter;

a second filter;
a switching apparatus; and
a controller,
wherein the controller is configured to determine whether a space is occupied by residents,
wherein when the space is occupied, the controller controls the switching apparatus to switch the first filter into an active airflow path; and when the space is unoccupied, the controller controls the switching apparatus to switch the first filter out of the active airflow path.

Aspect 23. A switchable filtration system for a heating, ventilation, air conditioning, and refrigeration (HVACR) system, the filtration system comprising:
a first filter;
a second filter;
a switching apparatus; and
a controller,
wherein the controller is configured to determine whether a space is ready for a pre-occupancy purge or a post-occupancy purge based on a predetermined schedule,
wherein during the pre-occupancy purge or the post-occupancy purge, when a measured condition exceeds a predetermined threshold, the controller controls the switching apparatus to switch the first filter into an active airflow path; and when the measured condition is at or below the predetermined threshold, the controller controls the switching apparatus to switch the first filter out of the active airflow path.

Aspect 24. A switchable filtration system for a heating, ventilation, air conditioning, and refrigeration (HVACR) system, the filtration system comprising:
a first filter;
a second filter;
a switching apparatus; and
a controller,
wherein the controller is configured to determine whether a space is ready for a warmup operation or a cooldown operation based on a predetermined schedule,
wherein during the warmup operation or the cooldown operation, when a measured condition exceeds a predetermined threshold, the controller controls the switching apparatus to switch the first filter into an active airflow path; and when the measured condition is at or below the predetermined threshold, the controller controls the switching apparatus to switch the first filter out of the active airflow path.

Aspect 25. A method of controlling a heating, ventilation, air conditioning, and refrigeration (HVACR) system and a multi-contaminant air cleaner (MCAC), the method comprising:
sensing, via at least one HVACR sensor, at least one comfort parameter;
sensing, via at least one MCAC sensor, at least one air-quality parameter;
determining, via a controller, minimum air changes of the HVACR system based on the at least one comfort parameter; and
determining, via the controller, equivalent air changes of the MCAC and an indoor air quality (IAQ) score based on the at least one air-quality parameter;
reducing an operation of the MCAC when a combination of the minimum air changes and the equivalent air changes exceeds or equals an air changes threshold and the IAQ score exceeds or equals an IAQ threshold;
increasing an operation of the HVACR system when the combination of the minimum air changes and the equivalent air changes is below the air changes threshold and the operation of the MCAC is maximized; and
increasing the operation of the MCAC when the combination of the minimum air changes and the equivalent air changes exceeds or equals an air changes threshold and the IAQ score is below the IAQ threshold, or when the combination of the minimum air changes and the equivalent air changes is below the air changes threshold and the operation of the MCAC is not maximized.

Aspect 26. The method according to aspect 25, further comprising:
estimating, via the controller, an energy usage of the HVACR system based on the operation of the HVACR system; estimating, via the controller, an energy usage of the MCAC based on the operation of the MCAC; and recording the energy usage of the HVACR system and the energy usage of the MCAC.

Aspect 27. The method according to aspect 26, further comprising:
predicting the operation of the HVACR system based on the recorded energy usage of the HVACR system and the recorded energy usage of the MCAC; and
controlling, via the controller, the operation of the HVACR system based on the predicted operation of the HVACR system.

Aspect 28. The method according to aspect 26 or aspect 27, further comprising:
predicting the operation of the MCAC based on the recorded energy usage of the HVACR system and the recorded energy usage of the MCAC; and
controlling, via the controller, the operation of the MCAC based on the predicted operation of the MCAC.

Aspect 29. The method according to any one of aspects 26-28, further comprising:
controlling the operation of the HVACR system and the operation of the MCAC to minimize a combination of the energy usage of the HVACR system and the energy usage of the MCAC.

Aspect 30. The method according to any one of aspects 26-29, further comprising:
visualizing or displaying the energy usage of the HVACR system and the energy usage of the MCAC.

Aspect 31. The method according to any one of aspects 25-30, wherein reducing an operation of the MCAC includes reducing a speed of a fan of the MCAC.

Aspect 32. The method according to any one of aspects 25-31, wherein reducing an operation of the MCAC includes turning off a fan of the MCAC.

Aspect 33. The method according to any one of aspects 25-32, wherein increasing an operation of the HVACR system includes increasing outdoor air ventilation by controlling a damper.

Aspect 34. The method according to any one of aspects 25-33, wherein increasing an operation of the MCAC includes increasing a speed of a fan of the MCAC.

Aspect 35. The method according to any one of aspects 25-34, wherein increasing an operation of the MCAC includes switching a filter into an active airflow path.

Aspect 36. The method according to any one of aspects 25-35, wherein the MCAC includes a pre-filter, a high efficiency particulate air (HEPA) filter, a fan, a gas scrubber, and a dry hydrogen peroxide (DHP) generator.

Aspect 37. The method according to aspect 36, wherein the DHP generator is disposed downstream from other components of the MCAC with respect to an airflow.

Aspect 38. The method according to aspect 36 or aspect 37, wherein the MCAC further includes a valve, and another fan.

Aspect 39. The method according to any one of aspects 25-38, wherein the MCAC is independent to the HVACR system, and the controller is configured to holistically control the operation of the MCAC and the operation of the HVACR system.

Aspect 40. The method according to any one of aspects 25-39, wherein the at least one comfort parameter includes a temperature, a relative humidity, and a level of carbon dioxide.

Aspect 41. The method according to any one of aspects 25-40, wherein the at least one air-quality parameter includes a level of volatile organic compounds (VOCs), a level of fine particulate matter (PM), a level of infectious pathogens, a level of ozone (O3), a level of carbon monoxide (CO), and a level of formaldehyde.

Aspect 42. The method according to any one of aspects 25-41, wherein the at least one HVACR sensor includes a temperature sensor.

Aspect 43. The method according to any one of aspects 25-42, wherein the at least one MCAC sensor includes a metal oxide sensor.

Aspect 44. The method according to any one of aspects 25-43, wherein determining equivalent air changes of the MCAC includes determining a clean air delivery rate (CADR) of the MCAC.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method of controlling a heating, ventilation, air conditioning, and refrigeration (HVACR) system and a multi-contaminant air cleaner (MCAC), the method comprising:
    sensing, via at least one HVACR sensor, at least one comfort parameter;
    sensing, via at least one MCAC sensor, at least one air-quality parameter;
    determining, via a controller, minimum air changes of the HVACR system to achieve comfort setpoints based on the at least one comfort parameter; and
    determining, via the controller, equivalent air changes of the MCAC and an indoor air quality (IAQ) score based on the at least one air-quality parameter, the IAQ score indicating a quality of an indoor air, a higher IAQ score indicating a higher quality of the indoor air;
    controlling an operation of the MCAC to reduce the IAQ score when a combination of the minimum air changes and the equivalent air changes exceeds or equals an air changes threshold and the IAQ score exceeds or equals an IAQ threshold;
    controlling an operation of the HVACR system to increase the minimum air changes when the combination of the minimum air changes and the equivalent air changes is below the air changes threshold and the operation of the MCAC is maximized; and
    controlling the operation of the MCAC to increase the IAQ score when the combination of the minimum air changes and the equivalent air changes exceeds or equals the air changes threshold and the IAQ score is below the IAQ threshold, or when the combination of the minimum air changes and the equivalent air changes is below the air changes threshold and the operation of the MCAC is not maximized.

2. The method according to claim 1, further comprising:
    estimating, via the controller, an energy usage of the HVACR system based on the operation of the HVACR system; estimating, via the controller, an energy usage of the MCAC based on the operation of the MCAC; and
    recording the energy usage of the HVACR system and the energy usage of the MCAC.

3. The method according to claim 2, further comprising:
    predicting the operation of the HVACR system based on the recorded energy usage of the HVACR system and the recorded energy usage of the MCAC; and
    controlling, via the controller, the operation of the HVACR system based on the predicted operation of the HVACR system.

4. The method according to claim 2, further comprising:
    predicting the operation of the MCAC based on the recorded energy usage of the HVACR system and the recorded energy usage of the MCAC; and
    controlling, via the controller, the operation of the MCAC based on the predicted operation of the MCAC.

5. The method according to claim 2, further comprising:
    controlling the operation of the HVACR system and the operation of the MCAC to minimize a combination of the energy usage of the HVACR system and the energy usage of the MCAC.

6. The method according to claim 2, further comprising:
    visualizing or displaying the energy usage of the HVACR system and the energy usage of the MCAC.

7. The method according to claim 1, wherein controlling the operation of the MCAC includes reducing a speed of a fan of the MCAC.

8. The method according to claim 1, wherein controlling the operation of the MCAC includes turning off a fan of the MCAC.

9. The method according to claim 1, wherein controlling the operation of the HVACR system includes increasing outdoor air ventilation by controlling a damper.

10. The method according to claim 1, wherein controlling the operation of the MCAC includes increasing a speed of a fan of the MCAC.

11. The method according to claim 1, wherein controlling the operation of the MCAC includes switching a filter into an active airflow path.

12. The method according to claim 1, wherein the MCAC includes a pre-filter, a high efficiency particulate air (HEPA) filter, a fan, a gas scrubber, and a dry hydrogen peroxide (DHP) generator.

13. The method according to claim 12, wherein the DHP generator is disposed downstream from other components of the MCAC with respect to an airflow.

14. The method according to claim 12, wherein the MCAC further includes a valve and another fan.

15. The method according to claim 1, wherein the MCAC is independent to the HVACR system, and the controller is configured to holistically control the operation of the MCAC and the operation of the HVACR system.

16. The method according to claim 1, wherein the at least one comfort parameter includes a temperature, a relative humidity, and a level of carbon dioxide.

17. The method according to claim 1, wherein the at least one air-quality parameter includes a level of volatile organic compounds (VOCs), a level of fine particulate matter (PM), a level of infectious pathogens, a level of ozone (03), a level of carbon monoxide (CO), and a level of formaldehyde.

18. The method according to claim 1, wherein the at least one HVACR sensor includes a temperature sensor.

19. The method according to claim 1, wherein the at least one MCAC sensor includes a metal oxide sensor.

20. The method according to claim 1, wherein determining equivalent air changes of the MCAC includes determining a clean air delivery rate (CADR) of the MCAC.

* * * * *